(12) United States Patent
Lee et al.

(10) Patent No.: US 11,868,435 B1
(45) Date of Patent: Jan. 9, 2024

(54) DATA DIAGNOSIS METHOD, A COMPUTER PROGRAM STORING THE DATA DIAGNOSIS METHOD, AND COMPUTING DEVICE FOR PERFORMING DATA DIAGNOSIS METHOD

(71) Applicant: PEBBLOUS INC., Daejeon (KR)

(72) Inventors: Joo Haeng Lee, Sejong-si (KR); Jeong Won Lee, Daejeon (KR)

(73) Assignee: PEBBLOUS INC., Daejeon (KR)

( * ) Notice: Subject to any disclaimer, the term of this patent is extended or adjusted under 35 U.S.C. 154(b) by 0 days.

(21) Appl. No.: 18/129,711

(22) Filed: Mar. 31, 2023

Related U.S. Application Data

(63) Continuation of application No. 17/898,109, filed on Aug. 29, 2022, now Pat. No. 11,748,447.

(30) Foreign Application Priority Data

Jun. 29, 2022 (KR) .................... 10-2022-0079508
Jun. 29, 2022 (KR) .................... 10-2022-0079509
Jun. 29, 2022 (KR) .................... 10-2022-0079510

(51) Int. Cl.
*G06F 18/214* (2023.01)
*G06N 20/00* (2019.01)
*G06F 18/22* (2023.01)
*G06F 18/213* (2023.01)

(52) U.S. Cl.
CPC .......... *G06F 18/214* (2023.01); *G06F 18/213* (2023.01); *G06F 18/22* (2023.01); *G06N 20/00* (2019.01)

(58) Field of Classification Search
CPC ....... G06F 18/214; G06F 18/22; G06F 18/213
See application file for complete search history.

(56) References Cited

U.S. PATENT DOCUMENTS

2022/0383570 A1  12/2022  Ling et al.

OTHER PUBLICATIONS

Bellinger, Colin, Christopher Drummond, and Nathalie Japkowicz. "Manifold-based synthetic oversampling with manifold conformance estimation." Machine Learning 107 (2018): 605-637. (Year: 2018).*

Feng, Qianyu, et al. "Look, Evolve and Mold: Learning 3D Shape Manifold via Single-view Synthetic Data." arXiv e-prints, pp. arXiv 2103 (2021). (Year: 2021).*

(Continued)

*Primary Examiner* — Eric Nilsson
(74) *Attorney, Agent, or Firm* — Maschoff Brennan

(57) ABSTRACT

According to an embodiments of the present disclosure, a method comprising: at an electronic device with one or more processors, obtaining a data set; identifying, based on the data set, a first data point set on a first embedding space, wherein each data point included in the first data point set corresponds to each data included in the data set; identifying a modified first data point set on the first embedding space based on the first data point set by adjusting a property associated with a distribution of the first data point set, wherein the modified first data point set includes at least one modified data point which is not included in the first data point set; and providing a Modified Image of Data (MIOD) by representing the modified first data point set on an imaging space may be provided.

20 Claims, 33 Drawing Sheets

(56) References Cited

OTHER PUBLICATIONS

Law, Martin HC, and Anil K. Jain. "Incremental nonlinear dimensionality reduction by manifold learning." IEEE transactions on pattern analysis and machine intelligence 28.3 (2006): 377-391. (Year: 2006).*

Bellinger et al. "Manifold-based synthetic oversampling with manifold conformance estimation." Machine Learning 107 (2018): 605-637. Published Oct. 19, 2017.

Feng et al. "Look, Evolve and Mold: Learning 3D Shape Manifold via Single-view Synthetic Data." arXiv e-prints, pp. arXiv-2103 (Mar. 2021).

* cited by examiner

DATA DIAGNOSIS METHOD, A COMPUTER PROGRAM STORING THE DATA DIAGNOSIS METHOD, AND COMPUTING DEVICE FOR PERFORMING DATA DIAGNOSIS METHOD

CROSS-REFERENCE TO RELATED APPLICATION

This application claims priority to and the benefit of Korean Patent Application No. 2022-0079508, filed on Jun. 29, 2022, Korean Patent Application No. 2022-0079509, filed on Jun. 29, 2022, and Korean Patent Application No. 2022-0079510, filed on Jun. 29, 2022, the disclosure of which is incorporated herein by reference in its entirety.

BACKGROUND

1. Field of the Invention

The present disclosure relates to a computing device that provides a comprehensive clinic solution for deep learning training data. More specifically, the present disclosure relates to a program in which a method of modifying data by accurately identifying essential characteristics of a data set used to train a deep learning model and generating high-quality synthetic data is stored, and a computing device for performing the method.

2. Discussion of Related Art

In recent years, deep learning-based artificial intelligence algorithms have been used in most technical fields. In particular, unstructured data without regularity is starting to be used in the deep learning field, and thus, the problem of increasing the amount of data used for training has emerged.

Industries have been proposing various solutions to solve the problem of the increase in data. In particular, as technologies for generating synthetic data are advanced, the synthetic data is being used to train deep learning models in various technical fields.

However, as the synthetic data is generated indiscriminately and artificial neural network-based deep learning models are advanced recently, the need to modify the quality of data rather than improving the quality of the learning model is increasing.

For this reason, it is important to accurately evaluate the quality of data for training deep learning models. However, there are clear limitations of a method of determining the quality of data available commercially as the method verifies only integrity of structured data. So, there is a need for a data solution that can be commonly applied to data used in various technical fields.

SUMMARY OF THE INVENTION

The present disclosure is directed to providing a computing device for a data clinic and a data clinic method.

In addition, the present disclosure is directed to providing a method of generating various pieces of information on a data set through the computing device according to the present disclosure and displaying the information in various ways.

Objectives to be solved by the present invention are not limited to the above-described objectives, and objectives which are not described above will be clearly understood by those skilled in the art through the present specification and the accompanying drawings.

According to an embodiments of the present disclosure, a method comprising: at an electronic device with one or more processors, obtaining a data set; identifying, based on the data set, a first data point set on a first embedding space, wherein each data point included in the first data point set corresponds to each data included in the data set; identifying a modified first data point set on the first embedding space based on the first data point set by adjusting a property associated with a distribution of the first data point set, wherein the modified first data point set includes at least one modified data point which is not included in the first data point set; and providing a Modified Image of Data (MIOD) by representing the modified first data point set on an imaging space may be provided.

In addition, according to an embodiments of the present disclosure, a computing device(or electronic device) for obtaining a data set and providing information about the data set, comprising: a memory configured to store a plurality of instructions; and at least one processor; wherein the plurality of instructions stored in the memory included a first instruction for instructing an operation of confirming a point data(data point) set based on the data set, wherein the point data set is obtained by representing the data set as point data in a latent space, a second instruction for instructing an operation of confirming characteristics of a data set based on the point data set, and a data image based on the point data set—the data image represents the point data set in an imaging space and a third instruction instructing an operation of providing, wherein the at least one processor obtains a data set, and based on a trigger identified according to the data set, at least one of the plurality of instructions, wherein the computing device may selectively perform an operation indicated by the above instructions may be provided.

According to an embodiment of the present disclosure, a computing device for obtaining a data set and providing a diagnostic result for the data set, comprising: an output device; memory; and at least one processor operating based on at least one instruction stored in the memory, wherein the at least one processor obtains a data set and maps the data set to a latent space to configure the first manifold—in this case, the first manifold includes a point data set corresponding to the data set—; acquiring a data image by displaying at least some of the point data included in the point data set in an imaging space, wherein the computing device outputs, through the output device, the data image and a diagnostic report including additional information obtained by analyzing the data image may be provided.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
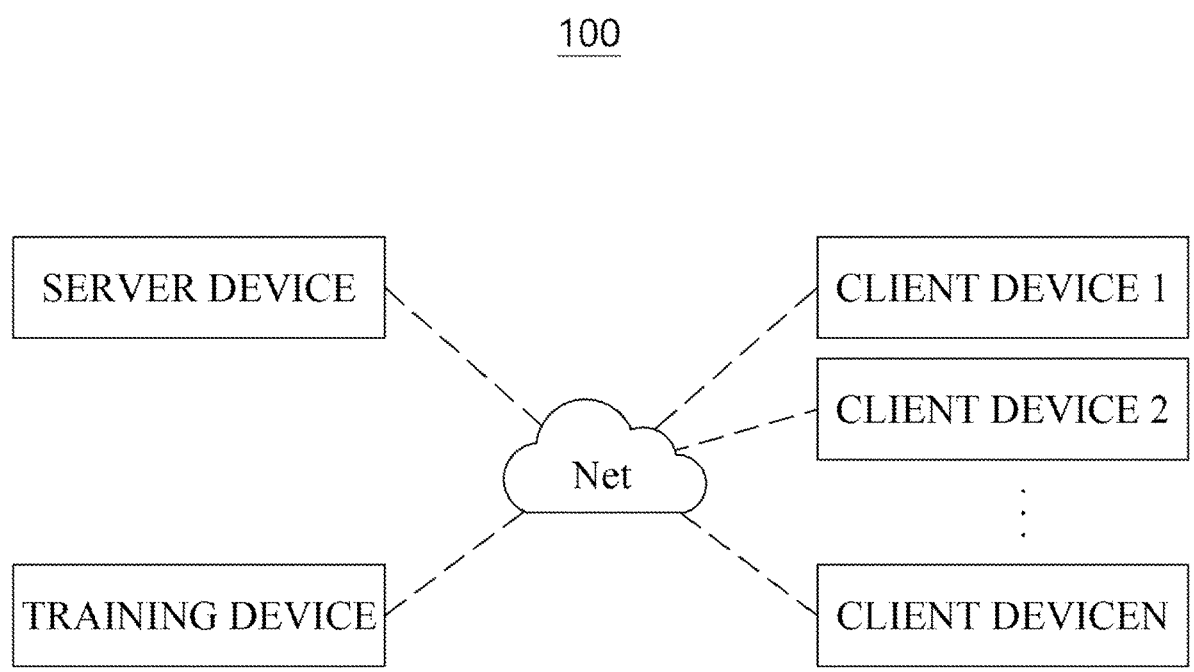
FIG. 1 is a diagram for describing an apparatus and system for performing a data clinic method according to various embodiments of the present disclosure.

Hereinafter, specific embodiments of the present invention will be described in detail with reference to the accompanying drawings. However, the scope of the present invention is not limited to the suggested embodiments, and other embodiments which are included in retrograde inventions or in the scope of the present invention may be easily suggested by those skilled in the art by adding, modifying, and deleting other components in the same scope of the present invention, and this may also be within the scope of the present invention.

Embodiments described in this specification are intended to clearly explain the spirit of the invention to those skilled in the art. Therefore, the present invention is not limited by the embodiments, and the scope of the present invention should be interpreted as encompassing modifications and variations without departing from the spirit of the invention.

Terms used in this specification are selected from among general terms, which are currently widely used, in consideration of functions in the present invention and may have meanings varying depending on intentions of those skilled in the art, customs in the field of the art, the emergence of new technologies, or the like. If a specific term is used with a specific meaning, the meaning of the term will be described specifically. Accordingly, the terms used in this specification should not be defined as simple names of the components but should be defined on the basis of the actual meaning of the terms and the whole context throughout the present specification.

The accompanying drawings are to facilitate the explanation of the present invention, and the shape in the drawings may be exaggerated for the purpose of convenience of explanation, so the present invention should not be limited by the drawings.

When it is determined that detailed descriptions of well-known elements or functions related to the present invention may obscure the subject matter of the present invention, detailed descriptions thereof will be omitted herein as necessary. In addition, numbers (eg, first, second, etc.) used in the description process of the present specification are merely identification symbols for distinguishing one component from other components.

In addition, the suffix "part" for components used in the following description are given or mixed in consideration of only the ease of writing the specification, and do not have distinct meanings or roles by themselves.

Terms such as "first" and/or "second" may be used to describe various elements, but the elements should not be limited by the terms. The above terms are used only for the purpose of distinguishing one element from another element, for example, without departing from the scope of rights according to the concept of the present disclosure, a first element may be called a second element, and similarly the second component may also be referred to as the first component.

When a component is referred to as being "connected" to another component, it is understood that the other component may be directly connected to the other component, but other components may exist in between. On the other hand, when it is said that a certain element is "directly connected" to another element, it should be understood that the other element does not exist in the middle. Other expressions describing the relationship between elements, such as "between" and "immediately between" or "neighboring to" and "directly neighboring(adjacent) to", etc., should be interpreted similarly.

In the drawings, each block of the flowchart diagrams and combinations of flowchart diagrams may be executed by computer program instructions. These computer program instructions may be embodied in a processor of a general-purpose computer, special-purpose computer, or other programmable data processing equipment, such that the instructions performed by the processor of the computer or other programmable data processing equipment are not described in the flowchart block(s). It creates a means to perform functions. These computer program instructions may also be stored in a computer-usable or computer-readable memory that may direct a computer or other programmable data processing equipment to implement a function in a particular manner, and thus the computer-usable or computer-readable memory. It may also be possible for the instructions stored in the flowchart block(s) to produce an article of manufacture containing instruction means for performing the function described in the flowchart block(s). The computer program instructions may also be mounted on a computer or other programmable data processing equipment, such that a series of operational steps are performed on the computer or other programmable data processing equipment to create a computer-executed process to create a computer or other programmable data processing equipment. It may also be possible for instructions to perform the processing equipment to provide steps for performing the functions described in the flowchart block(s).

Additionally, each block may represent a module, segment, or portion of code that includes one or more executable instructions for executing specified logical function(s). It should also be noted that in some alternative implementations it is also possible for the functions recited in the blocks to occur out of order. For example, two blocks shown one after another may in fact be performed substantially simultaneously, or it is possible that the blocks are sometimes performed in the reverse order according to the corresponding function.

As used in the present disclosure, the term '~ unit' refers to software or hardware components such as Field Programmable Gate Array (FPGA) or Application Specific Integrated Circuit (ASIC). 'Unit' performs specific roles but is not limited to software or hardware. '~ Unit' may be configured to reside in an addressable storage medium or may be configured to refresh one or more processors. Accordingly, according to some embodiments, '~ unit' refers to components such as software components, object-oriented software components, class components, and task components, and processes, functions, properties, and programs. Includes procedures, subroutines, segments of program code, drivers, firmware, microcode, circuitry, data, databases, data structures, tables, arrays, and variables. The functions provided in the components and '~ units' may be combined into a smaller number of components and '~ units' or further separated into additional components and '~ units'. In addition, components and '~ units' may be implemented to play one or more CPUs in a device or secure multimedia card. Also, according to various embodiments of the present disclosure, '~ unit' may include one or more processors.

Hereinafter, the operating principle of the present disclosure will be described in detail with reference to the accompanying drawings. In the following description of the present disclosure, if it is determined that a detailed description of a related well-known function or configuration may unnecessarily obscure the subject matter of the present disclosure, the detailed description thereof will be omitted. In addition, the terms described below are terms defined in consideration of functions in the present disclosure, which may vary according to intentions or customs of users and operators. Therefore, the definition should be made based on the content throughout this specification.

According to an embodiments of the present disclosure, a method comprising: at an electronic device with one or more processors, obtaining a data set; identifying, based on the data set, a first data point set on a first embedding space, wherein each data point included in the first data point set corresponds to each data included in the data set; identifying a modified first data point set on the first embedding space based on the first data point set by adjusting a property associated with a distribution of the first data point set, wherein the modified first data point set includes at least one modified data point which is not included in the first data point set; and providing a Modified Image of Data (MIOD) by representing the modified first data point set on an imaging space may be provided.

Here, identifying the first data point set comprises: identifying a first manifold obtained by mapping the data set on the first embedding space based on a first predetermined criterion, wherein the first manifold is associated with a shape formed by the first data point set; and identifying the first data point set included in the first manifold.

Here, identifying the first data point set further comprises: obtaining a first reconstruction data set by reconstructing the first data point set, wherein a modality of the first reconstruction data set corresponds to the data set, and wherein the first predetermined criterion is set based on a similarity between the data set and the first construction data set.

Here, the method further comprising: identifying, based on the first data point set, a second data point set on a second embedding space, wherein the modified first data set is obtained by reconstructing the second data point set to the first embedding space.

Here, identifying the second data point set comprises: identifying a second manifold obtained by mapping the first data point set to the second embedding space according to a second predetermined criterion, wherein the second manifold is associated with a shape formed by the second data point set, and identifying the second data point set included in the second manifold, and wherein the second predetermined criterion is set based on a similarity between a plurality of data points included in the first data point set.

Here, the at least one modified data point is obtained by reconstructing at least one data point included in the second data point set to the first embedding space.

Here, identifying the modified first data point set comprises: clustering the first data point set into at least one group; and adjusting a distance between a first data point included in a first group of the at least one group and a second data point included in a second group of the at least one group on the first embedding space.

Here, the distance between the first data point and the second data point is adjusted so that the distance between the first data point and the second data point is greater than a distance between the first data point and a third data point included in the first group.

Here, the method further comprising: providing an Image of Data (IOD) by representing the first data point set on the imaging space.

Here, providing the IOD comprises: identifying a boundary region formed by the first data point set on the first embedding space; and obtaining the IOD by representing the first data point set on the imaging space so that at least one data point positioned outside the boundary region is deleted.

Here, the method further comprising: providing a comparison information representing a difference between the IOD and the MIOD.

Here, the imaging space comprises a space in which the IOD and the MIOD are displayed by at least one output device connected to the electronic device.

Here, the imaging space comprises a space in which the modified first data point set is visually identified.

Here, providing the MIOD comprises: representing the at least one modified data point visually different with another data points included in the modified first data point set.

Here, the data set comprises a first data of a first modality and a second data of a second modality.

Here, the method further comprising:obtaining a property of the data set based on the first data point set and a modified property of the data set based on the modified first data point set.

Here, the method further comprising: providing a modified data set by reconstructing the modified first data point set on an output domain, wherein the modified data set includes at least one synthetic data corresponding to the at least one modified data point.

According to an embodiments of the present disclosure, a system comprising: a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising: obtaining a data set; identifying, based on the data set, a first data point set on a first embedding space, wherein each data point included in the first data point set corresponds to each data included in the data set; identifying a modified first data point set on the first embedding space based on the first data point set by adjusting a property associated with a distribution of the first data point set, wherein the modified first data point set includes at least one modified data point which is not included in the first data point set; and providing a Modified Image of Data (MIOD) by representing the modified first data point set on the imaging space may be provided.

According to an embodiments of the present disclosure, a non-transitory computer-readable storage medium, storing program instructions computer-executable on a computer to perform operations comprising: obtaining a data set; identifying, based on the data set, a first data point set on a first embedding space, wherein each data point included in the first data point set corresponds to each data included in the data set; identifying a modified first data point set on the first embedding space based on the first data point set by adjusting a property associated with a distribution of the first data point set, wherein the modified first data point set includes at least one modified data point which is not included in the first data point set; and providing a Modified Image of Data (MIOD) by representing the modified first data point set on the imaging space may be provided.

The present disclosure relates to a computing device (or an electronic device) and system that perform a data clinic method of evaluating the true quality of data set for training a deep learning model and providing improvements.

FIG. 1 is a diagram for describing an apparatus and system for performing a data clinic method according to various embodiments of the present disclosure.

The data clinic method of the present disclosure may be implemented on a communication network-based platform system 100. Specifically, a server device for collecting and processing data, a training device for training a learning model for various purposes, and a plurality of client devices may be connected to each other on a communication network to transmit or receive data.

For example, the server device may receive data from at least one of the plurality of client devices, and transmit the received data to the training device to train a specific learning model. In addition, the server device may generate modified data by processing the received data, and may transmit the modified data to the plurality of client devices.

In addition, for example, the plurality of client devices may access a server implemented by the server device via a communication network, and exchange data with other client devices or use a function implemented by the server through the server.

In addition, the server device, the plurality of client devices, and the training device may be implemented as one computing device. Specifically, according to an embodiment, a computing device that performs an operation of training a deep learning model, an operation of collecting and processing data, an operation of transmitting and receiving data, etc., may be provided.

In addition, the server device, the training device, and the plurality of client devices are implemented as one or more computing devices, and may include at least one processor (or controller).

Hereinafter, a computing device for providing a data clinic method is described in more detail.

Figure 2:
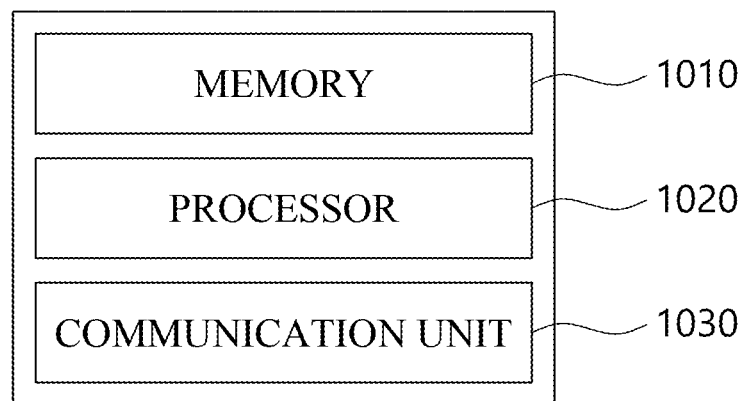
FIG. 2 is a block diagram illustrating a computing device for performing a data clinic method and a model training method of a data clinic according to various embodiments of the present disclosure.

FIG. 2 is a block diagram illustrating a computing device for performing a data clinic method and a model training method for a data clinic according to various embodiments of the present disclosure.

Referring to FIG. 2, a computing device 1000 may include various components for providing a data clinic method. Specifically, the computing device 1000 may include a memory 1010 that stores data and various instructions to be transmitted to a processor, a processor 1020 that performs an operation based on the instructions received from the memory 1010, and a communication unit 1030 that allows the computing device 1000 to perform internal data communication or enables communication between the computing device 1000 and an external device.

In addition, optionally or alternatively, the computing device 1000 may further include an input device (not illustrated). In this case, the input device is a device from which an external user input is first received. For example, the computing device 1000 may further include at least one input device such as a keyboard and a mouse.

In addition, optionally or alternatively, the computing device 1000 may further include an output device (not illustrated). In this case, the output device is a device for externally displaying specific information from the processor 1020. For example, the computing device 1000 may further include at least one of a display, a virtual reality (VR) device, augmented reality (AR) glasses, an AR projector, a printing device, or the like.

Figure 3:
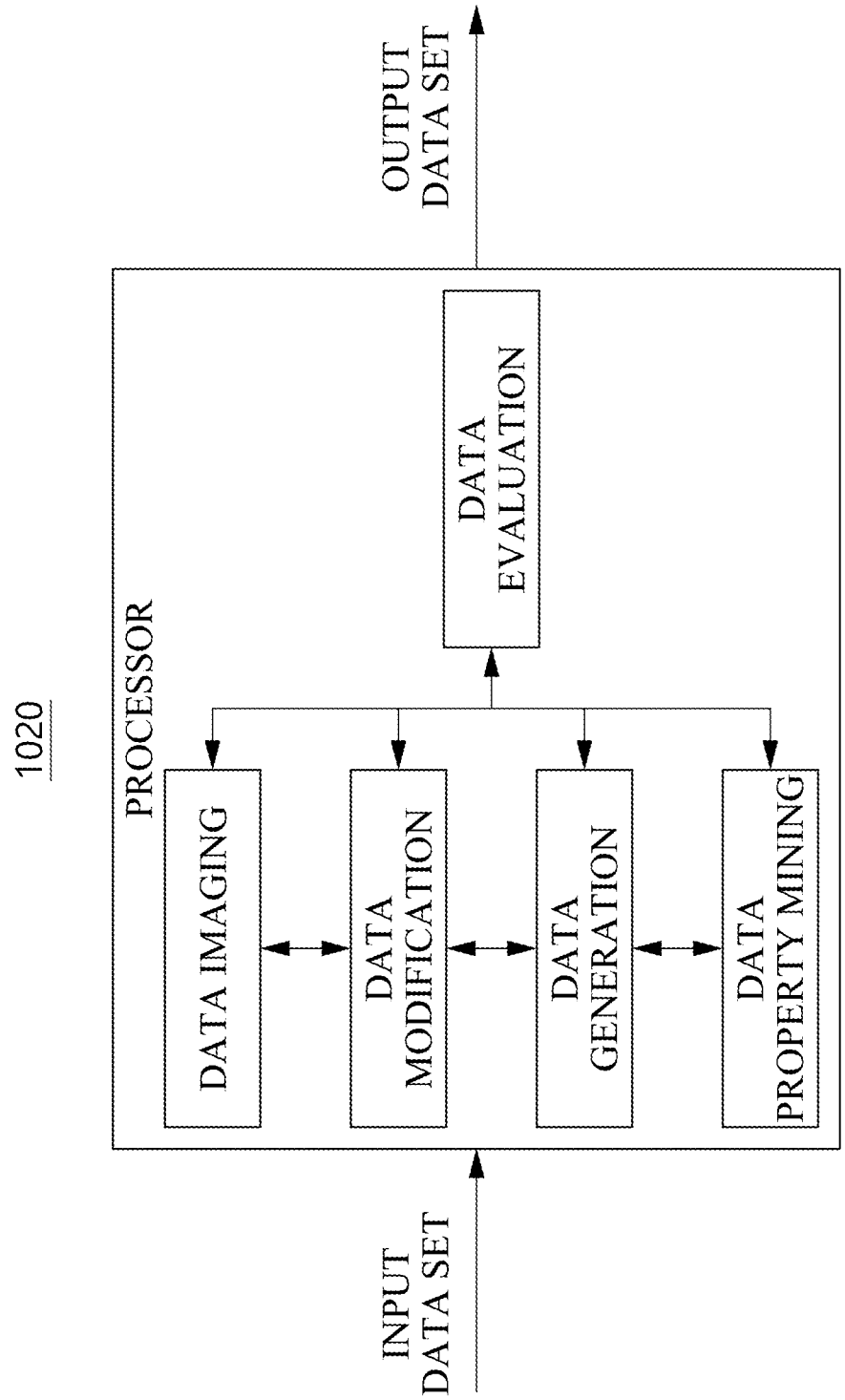
FIG. 3 is a diagram for describing various operating methods performed by a computing device for performing a data clinic method according to various embodiments of the present disclosure.

FIG. 3 is a diagram for describing various operating methods performed by a computing device for performing a data clinic method according to various embodiments of the present disclosure.

Referring to FIG. 3, at least one processor 1020 of a computing device for a data clinic may perform various operating methods to perform a data clinic method. In this case, various operating methods may be coded and stored in the memory of the computing device. Specifically, the at least one processor may process an input data set received based on various operating methods and output an output data set. In this case, details of data included in the input data set and the output data set will be described below (described with reference to FIGS. 4 to 33).

For example, a computing device according to various embodiments of the present disclosure may perform an operating method of data imaging, an operating method of data modification, an operating method of data generation, an operating method of data property mining, or an operating method of data evaluation, but is not limited thereto.

In addition, each of the above-described operating methods may be performed based on operation algorithms of at least one processor included in the computing device.

For example, the computing device according to various embodiments of the present disclosure may perform a data imaging algorithm, a data modification algorithm, a data generation algorithm, a data property mining algorithm, a data evaluation algorithm, or the like, but is not limited thereto.

In this case, since names of each operating method and algorithm are arbitrarily named according to output results for convenience of description, each operating method or algorithm is only defined based on the operations performed by the processor. The names of the operating method or algorithm itself do not limit the invention.

More specifically, the computing device according to various embodiments of the present disclosure may generate an image of an input data set by processing the input data set according to the data imaging algorithm.

In addition, the computing device according to various embodiments of the present disclosure may process the input data set according to the data modification algorithm to modify data, and may generate results of the modification.

In addition, the computing device according to various embodiments of the present disclosure may generate synthetic data by processing the input data set according to the data generation algorithm.

In addition, the computing device according to various embodiments of the present disclosure may process the input data set according to the data property mining algorithm to mine the property of the input data set.

In addition, the computing device according to various embodiments of the present disclosure may process the input data set according to the data evaluation algorithm to evaluate the quality of the input data set.

Details of each algorithm described above will be described below.

In addition, the computing device according to various embodiments of the present disclosure may perform the above-described various operating methods or algorithms in parallel, sequentially, or selectively. Specifically, the computing device may use the same input data in parallel as input values of different algorithms, continuously use a result value output according to a specific algorithm as an input value of another algorithm, or selectively perform some of the plurality of algorithms in a predetermined manner.

In addition, various operating methods or algorithms for the above-described data clinic may be performed on a deep learning model included in the computing device according to various embodiments of the present disclosure. Specifically, the computing device according to various embodiments of the present disclosure may include one deep learning model for performing various operating methods or algorithms described above, but is not limited thereto, and may include a plurality of deep learning models for performing each of the above-described operating methods or algorithms, and include one or more deep learning models for performing at least some of the above-described various operating methods or algorithms.

Figure 4:
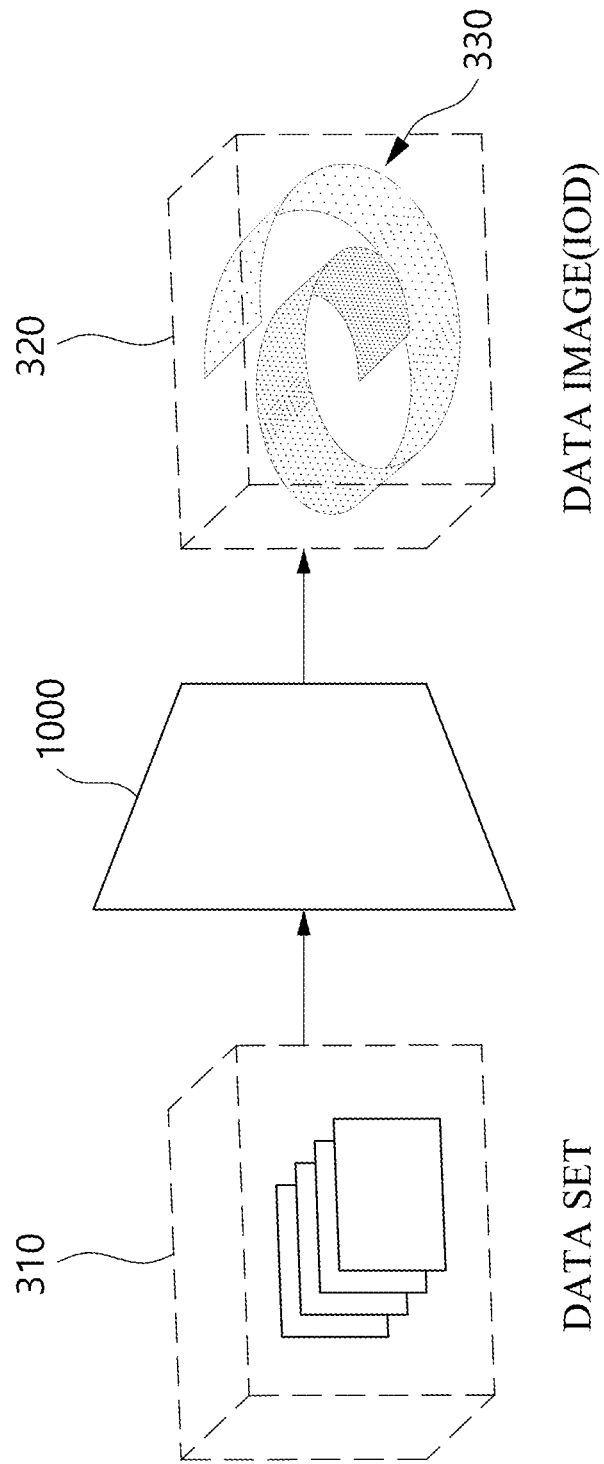
FIG. 4 is a diagram for describing a method of providing, by a computing device, an image of data according to various embodiments of the present disclosure.

FIG. 4 is a diagram for describing a method of providing, by a computing device, an image of data according to various embodiments of the present disclosure.

Referring to FIG. 4, the computing device 1000 according to various embodiments of the present disclosure may receive a data set and provide an image of data IOD.

In this case, the data set may be M (M>0)-dimensional data. In other words, the data set may be a data set defined in an M-dimensional input space 310.

In addition, the data set may be a data set of a single modality. For example, the data set may be an image data set. In addition, the data set may be a text data set.

In addition, the present disclosure is not limited thereto, and the data set may be a set of data having different modalities. For example, the data set may be an image data set including annotation information. In addition, the data set may be a mixed data set of images and text.

The computing device 1000 according to various embodiments of the present disclosure may input and process, as an input data set, data of all modalities that may be used for deep learning training, such as a time series data set and a sensor data set, as well as the above-described image data and text data.

The image of data IOD provided by the computing device 1000 according to various embodiments of the present disclosure may be represented in an imaging space 320 by processing the input data set. Here, the image does not mean a 2D image, but is a representation that refers to a visual representation of data. Specifically, the imaging space 320 is a concept including all of a 2D space, a 3D space, and an N-dimensional virtual space, and refers to a space in which an image of data provided according to an embodiment is represented. For example, when the computing device processes the input data set and outputs the image of data in a PDF format, the computing device may output an output representing the image of data in a 2D or 3D imaging space, but is not limited thereto.

When the computing device 1000 according to various embodiments of the present disclosure includes an output device (not illustrated), the computing device may provide an image of data through the output device. For example, the computing device 1000 may provide an image of data by outputting the image of data through a display connected to the computing device 1000. In this case, the imaging space 320 may be a screen of the display. In addition, for example, the computing device 1000 may provide an image of data by outputting the image of data through a printing device connected to the computing device 1000. In this case, the imaging space 320 may be a piece of paper output by the printing device.

In addition, when the computing device 1000 according to various embodiments of the present disclosure communicates with an external device through a communication unit, the computing device 1000 may provide the image of data through the external device. In this case, the imaging space 320 may be a display screen of the external device. For example, when the computing device 1000 is a server device, the server device may provide an image of data by transmitting the image of data to at least one external device communicating with the server device through a network connected to the server device.

The computing device according to various embodiments of the present disclosure may provide an image of data including a data point (or point data) set 330 corresponding to the input data set. In this case, the data point set 330 may be a data set in which each piece of data included in the data set is visualized as a point. In this case, a shape, a color, or the like of the visualized point may be variously selected depending on the embodiment, and thus, the term "point" is not intended to limit the present disclosure.

In addition, the point may be expressed with various terms according to embodiments. For example, the point may be expressed with terms such as a vector or a feature appearing in an embedding space or a latent space, but is not limited thereto.

In order for the computing device according to various embodiments of the present disclosure to provide an image of data, as described above, it is necessary to identify a data point set corresponding to the input data set.

In this case, the computing device may obtain the data point set by identifying a manifold in which data included in the input data set is formed in an embedding space (or latent space) of a specific dimension. Here, the manifold may mean a virtual space of a specific dimension in which data is actually present in the dimension of the input space in which the input data set is defined. In addition, the manifold may mean any shape that data forms in a specific dimension.

In other words, when the input data set received is mapped to a data point set on an embedding space of a specific dimension, the manifold may mean a region in which the data point set is identified or a shape formed by the data point set.

Hereinafter, a method of identifying, by a computing device, a data point set corresponding to an input data set and providing an image of data based on the identified data point set according to various embodiments of the present disclosure will be described in detail.

The computing device 1000 providing the image of data according to FIG. 4 may include a model for generating an imaging manifold (not illustrated) for identifying the data point set.

Figure 5:
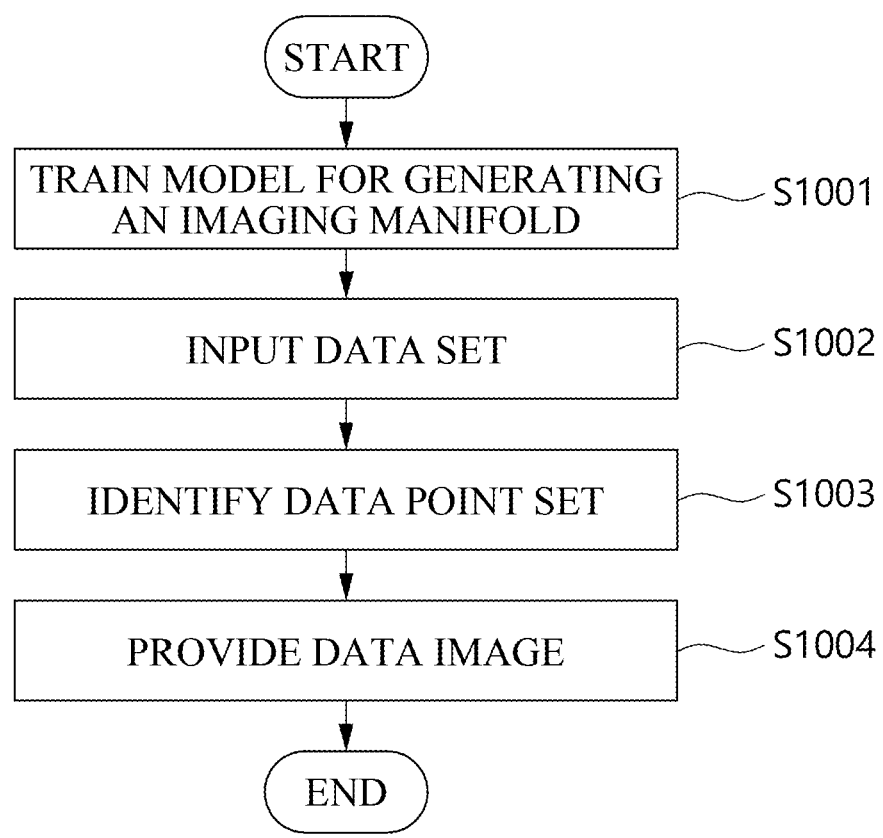
FIG. 5 is a flowchart for describing a method of providing, by a computing device, an image of data according to various embodiments of the present disclosure.

FIG. 5 is a flowchart for describing a method of providing, by a computing device, an image of data according to various embodiments of the present disclosure.

Referring to FIG. 5, the computing device may train a model for generating an imaging manifold for identifying a data point set included in an image of data (S1001). In this case, the model for generating an imaging manifold may be a deep learning model including an artificial neural network.

The computing device 1000 may train a model for generating an imaging manifold to build a manifold of a specific dimension in which an intrinsic property of a data set is preserved. Here, the intrinsic property of the data set means a property related to a distribution of data itself, regardless of a modality of data, a domain in which data is defined, a category of data, and the like. For example, the intrinsic property of the data set may include a distance between data points included in the data set. In this case, the distance between the data points may mean a Euclidean distance, but is not limited thereto, and may include all mathematical concepts commonly used as a distance between data points among those skilled in the art.

The property of data defined through the present disclosure will be described in more detail below (description with reference to FIGS. 10 to 15).

An example of a method of training, by a computing device, a model for generating an imaging manifold according to various embodiments of the present disclosure will be described with reference to FIG. 6.

Figure 6:
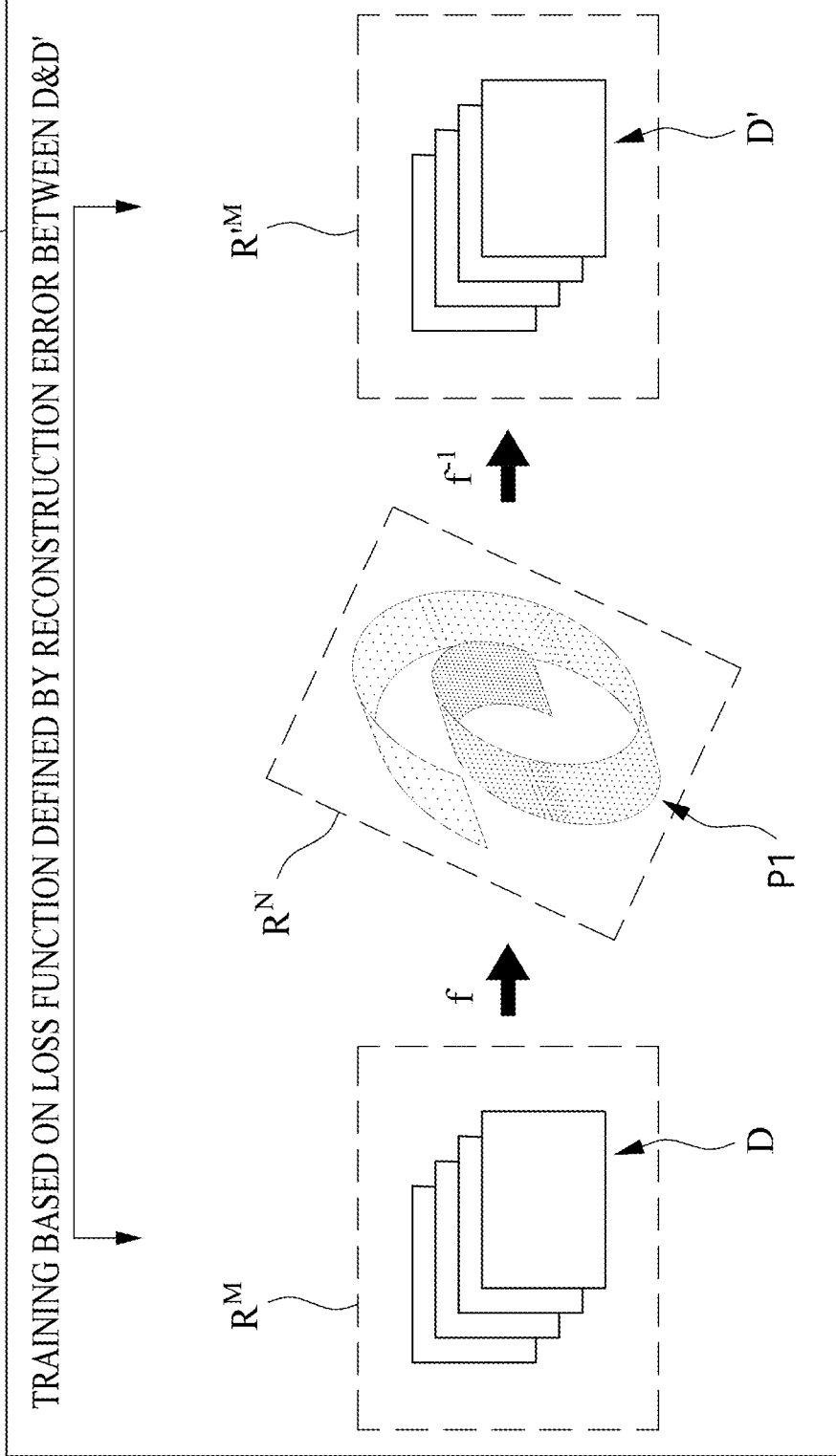
FIG. 6 is a diagram illustrating an example of a method of training, by a computing device, a model for generating an imaging manifold according to various embodiments of the present disclosure.

FIG. 6 is a diagram illustrating an example of a method of training, by a computing device, a model for generating an imaging manifold according to various embodiments of the present disclosure.

Referring to FIG. 6, the computing device 1000 may train a model for generating an imaging manifold to find a manifold maintaining an intrinsic property of a training data set D based on the training data set D.

In addition, the computing device 1000 may obtain a first data point set P1 based on the training data set D. In this case, the training data set D may be an M-dimensional data set that may be defined in an M-dimensional input domain $R^M$.

In addition, the computing device may obtain the first data point set P1 by processing the training data set D according to a predetermined condition. Specifically, the computing device may obtain the first data point set P1 by mapping the training data set D to an N-dimensional first embedding space $R^N$ based on a predetermined condition (e.g., a matrix stored in advance for mapping to an embedding space of a specific dimension) defined by a mapping function f. For example, the computing device may obtain the first data point set P1 by encoding the training data set D, but is not limited thereto.

A method of determining an optimal dimension of a manifold in which the data point set is defined will be described in detail with reference to FIG. 9.

In addition, the computing device may obtain a reconstruction data set D' based on the first data point set P1. In this case, the reconstruction data set D' may be an M-dimensional data set that may be defined in the same M-dimensional space as the training data set D.

In addition, the computing device may obtain the reconstruction data set D' by processing the first data point set P1 according to a predetermined condition. Specifically, the computing device may obtain the reconstruction data set D' by reconstructing the first data point set P1 on an M-dimensional output domain $R^{t,M}$ based on a predetermined condition (e.g., an inverse matrix of a matrix stored in advance for mapping to an embedding space of a specific dimension) defined as an inverse function $f^{-1}$ of the mapping function f. In this case, the input domain and the output domain may be included in the same virtual space, but is not limited thereto.

In addition, the computing device may train a model for generating an imaging manifold based on the training data set D and the reconstruction data set D'. Specifically, the computing device may train the model for generating an imaging manifold based on a loss function defined based on a similarity between the training data set D and the reconstruction data set D'. For example, the computing device may train the model for generating an imaging manifold in a direction that minimizes a reconstruction error on how similarly the reconstruction data set D' is reconstructed to the training data set D, but is not limited thereto.

Figure 7:
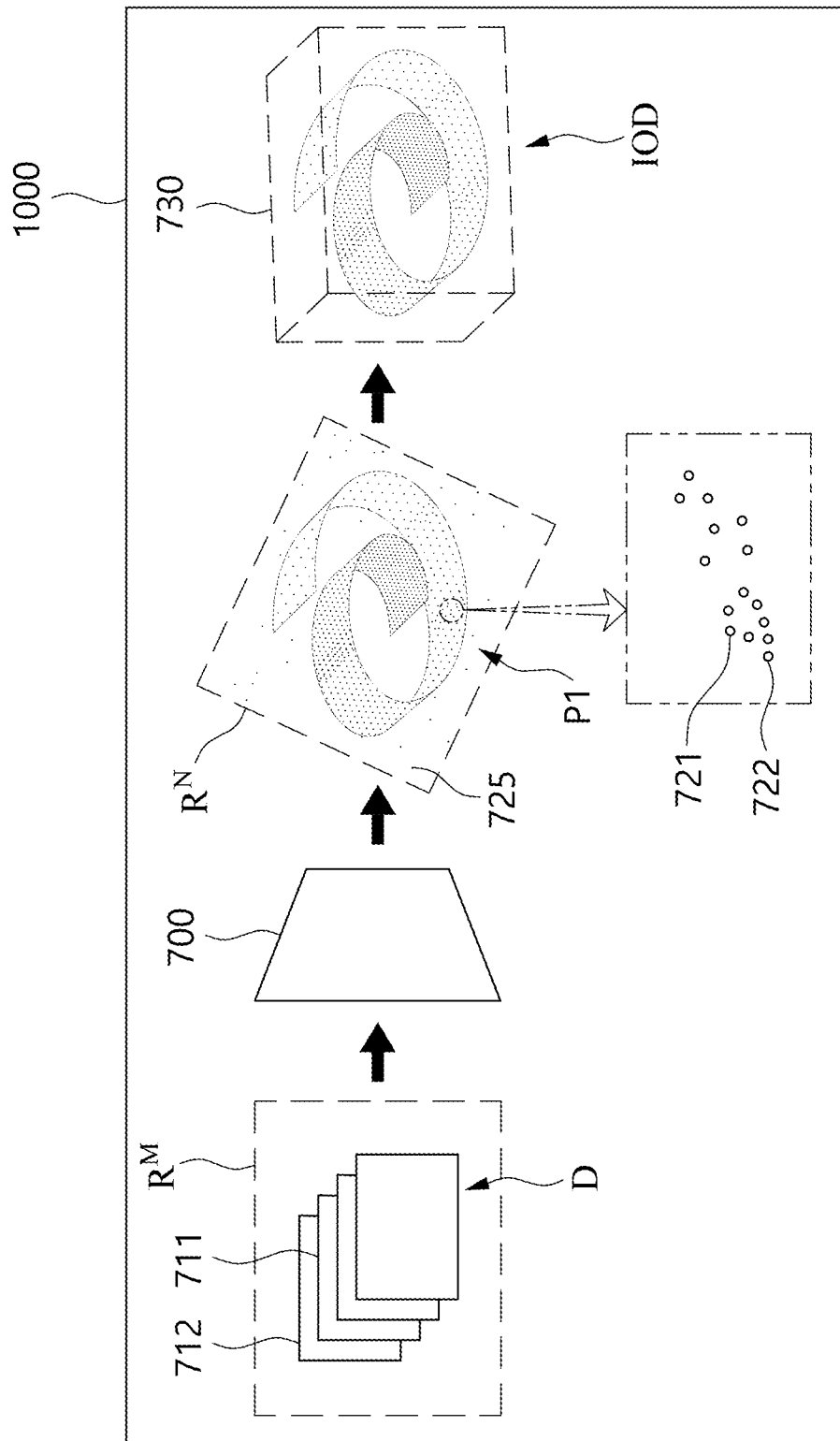
FIG. 7 is a diagram for describing a data imaging process of a computing device according to various embodiments of the present disclosure.

FIG. 7 is a diagram for describing a data imaging process of a computing device according to various embodiments of the present disclosure.

Referring back to FIG. 5, the computing device may input the data set to the trained model for generating an imaging manifold (S1002). In this case, the computing device may input a data set received from the outside to the trained model for generating an imaging manifold, or may receive a data set stored in the computing device. For example, the computing device may receive the data set from an external device connected through a communication network or call the data set stored in the memory of the computing device, but is not limited thereto.

For example, referring to FIG. 7, the computing device 1000 may input the data set D defined in the M-dimensional input domain R M to the model for generating an imaging manifold 700.

In addition, referring back to FIG. 5, the computing device may identify a data point set corresponding to the data set by processing the input data set through the model for generating an imaging manifold (S1003).

For example, referring back to FIG. 7, since the model for generating an imaging manifold 700 may output the first data point set P1 defined in an N-dimensional first embedding space $R^N$ based on the input data set D, the computing device 1000 may identify the first data point set P1. In this case, the first data point set P1 may form an N-dimensional first manifold.

In addition, the first data point set P1 output from the model for generating an imaging manifold 700 may reflect a relationship between data included in the data set D received by the model for generating an imaging manifold 700. More specifically, the model for generating an imaging manifold 700 may be trained to maintain the intrinsic properties such as the relevance or similarity between data included in the input data set as described with reference to FIG. 6. Accordingly, when the trained model for generating an imaging manifold 700 receives the data set D, the first data point set P1 representing a relationship between data included in the data set D by generating the N-dimensional manifold may be output. This is because the computing device has trained the model for generating an imaging manifold to minimize an error between the data set input to the model for generating an imaging manifold and the data set reconstructed from the model for generating an imaging manifold.

In addition, the first data point set P1 output from the model for generating an imaging manifold 700 may correspond to the input data set D. In this case, each point included in the first data point set P1 may correspond to each data point included in the data set D. For example, a first image data point 711 included in the data set D may correspond to a first data point 721 included in the data point set, and a second image data point 712 may correspond to a second data point 722.

In addition, a distance between points included in the first data point set P1 output from the model for generating an imaging manifold 700 may be determined based on the relationship between data included in the data set D input to the model for generating an imaging manifold 700. That is, the higher the relevance (or similarity) between the data included in the data set D, the closer the data may be positioned in the first embedding space.

In addition, the present invention is not limited thereto, and each point included in the data point set may correspond to two or more data points included in the data set. For example, the first image data point 711 and the second image data point 712 included in the data set may correspond to the first data point 721 included in the data point set.

In addition, the present invention is not limited thereto, and two or more points included in the data point set may correspond to two or more data points included in the data set. For example, the first image data point 711 and the second image data point 712 included in the data set may correspond to the first data point 721 and the second data point 722 included in the data point set.

In addition, the computing device 1000 may arbitrarily determine a visual shape of the first manifold in which the first data point set P1 is defined. Specifically, the computing device 1000 may obtain the first data point set P1 by mapping a plurality of data points in a manifold space having a predetermined shape so that the intrinsic property of the data set D is maintained. For example, the computing device 1000 may store in advance various templates (e.g., a spiral shape, etc.) for the shape of the first manifold, and may obtain the first data point set P1 based on at least one of various templates.

In addition, referring back to FIG. 5, the computing device may provide the identified data point set data image (S1004).

For example, referring back to FIG. 7, the computing device 1000 represents the first data point set P1 output from the model for generating an imaging manifold in an imaging domain (or imaging space 730) to obtain an image of data IOD. Specifically, the computing device 1000 may obtain the image of data IOD by mapping the first data point set P1 from the first embedding space to the imaging space.

In this case, the computing device 1000 may map the first data point set P1 according to a predetermined condition. Specifically, the computing device 1000 may obtain the image of data IOD by processing the first data point set P1 in a predetermined manner.

For example, the computing device 1000 may represent the first data point set P1 in the imaging space 730 so that the first data point set P1 is maintained as it is, but is not limited thereto.

In addition, for example, the computing device 1000 may generate the image of data so that noise data 725 included in the first data point set P1 is removed. In this case, the noise data 725 may be one or more data points positioned outside the manifold space formed by the first data point set P1 within the first data point set P1. In other words, the noise data 725 may be at least one outlier point with respect to the manifold space formed by the first data point set P1.

The above-described noise data may also be data corresponding to data included in the data set. The computing device may remove the noise data from an image of data to provide the image of data in order to provide a clearer image from a visualization point of view.

An example of providing, by the computing device, an image of data by removing noise data of a data point set will be described with reference to FIG. 8.

Figure 8:
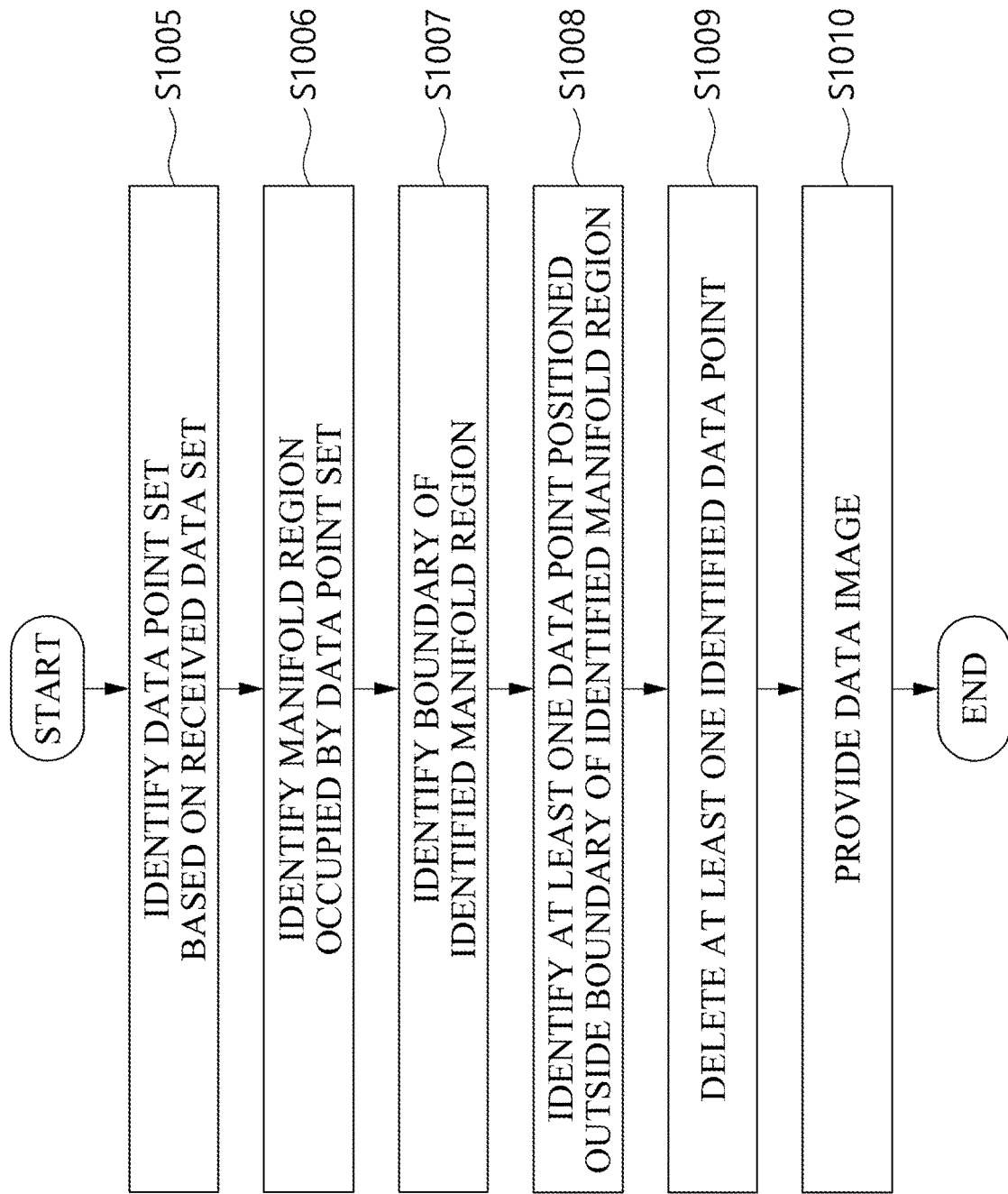
FIG. 8 is a flowchart illustrating an example of generating, by a computing device, an image of data based on a data point set according to various embodiments of the present disclosure.

FIG. 8 is a flowchart illustrating an example of generating, by the computing device, an image of data based on a data point set according to various embodiments of the present disclosure.

Referring to FIG. 8, the computing device may identify the data point set based on received input data set (S1005). The technical features of operation S1005 have been described above, and thus, a description thereof will be omitted.

In addition, the computing device may identify a manifold region occupied by the data point set, in which the data point set is formed (S1006). In this case, the manifold region may mean a virtual region formed by the data point set in a latent space (or embedding space) in which the data point set is defined.

In addition, the computing device may identify a boundary of the identified manifold region (S1007). In this case, the boundary of the manifold region may mean the shape of the manifold region. Specifically, the computing device may determine a boundary of a manifold region connected to points positioned outside the region in which the data point set is positioned.

In addition, the computing device may identify one or more data points(at least one data point) positioned outside the boundary of the identified manifold region (S1008). Specifically, the computing device may determine one or more data points positioned outside the boundary of the identified manifold region as noise data (or outlier data).

In addition, the computing device may delete the one or more(at least one) identified data points (S1009). Specifically, the computing device may enhance the visual effect of the image of data by deleting at least one data point determined as the noise data.

In addition, the computing device may provide an image of data based on the data point set output according to operation S1009 (S1010).

To provide an image of data that better reveals the intrinsic properties of the data set, it is necessary to optimize the manifold formed by the data point set. Here, the optimization of the manifold may mean generating a manifold with a minimized reconstruction error through the training of the model for generating a manifold described with reference to FIG. 6, but is not limited thereto, and the manifold generated according to the training result may mean a process of optimizing based on another method.

Specifically, the computing device according to various embodiments may generate the represented manifold by optimizing the intrinsic property of the data set by processing the data set according to a predetermined method.

For example, the computing device according to various embodiments may generate a manifold of a data point set to minimize an amount of noise data. Specifically, the computing device may iterate the manifold generation process to reduce the amount of noise data. In this case, the computing device may iterate the process of generating a manifold until the noise data included in the manifold meets a predetermined criterion or less.

To provide an image of data that better reveals the intrinsic properties of the data set, it is necessary to determine the optimal dimension of the manifold formed by the data point set. This is because, when generating an image of data based on a low-dimensional manifold for efficiency of data processing, the actual structure of the data set may be distorted, and when generating an image of data based on a high-dimensional manifold for accuracy, the efficiency of data processing may decrease.

In order to solve the above-described problem, the computing device according to various embodiments of the present disclosure may determine an optimal dimension for data imaging based on a method of determining various manifold dimensions.

Hereinafter, an example of determining, by a computing device, an optimal manifold dimension for data imaging according to various embodiments of the present disclosure will be described.

Figure 9:
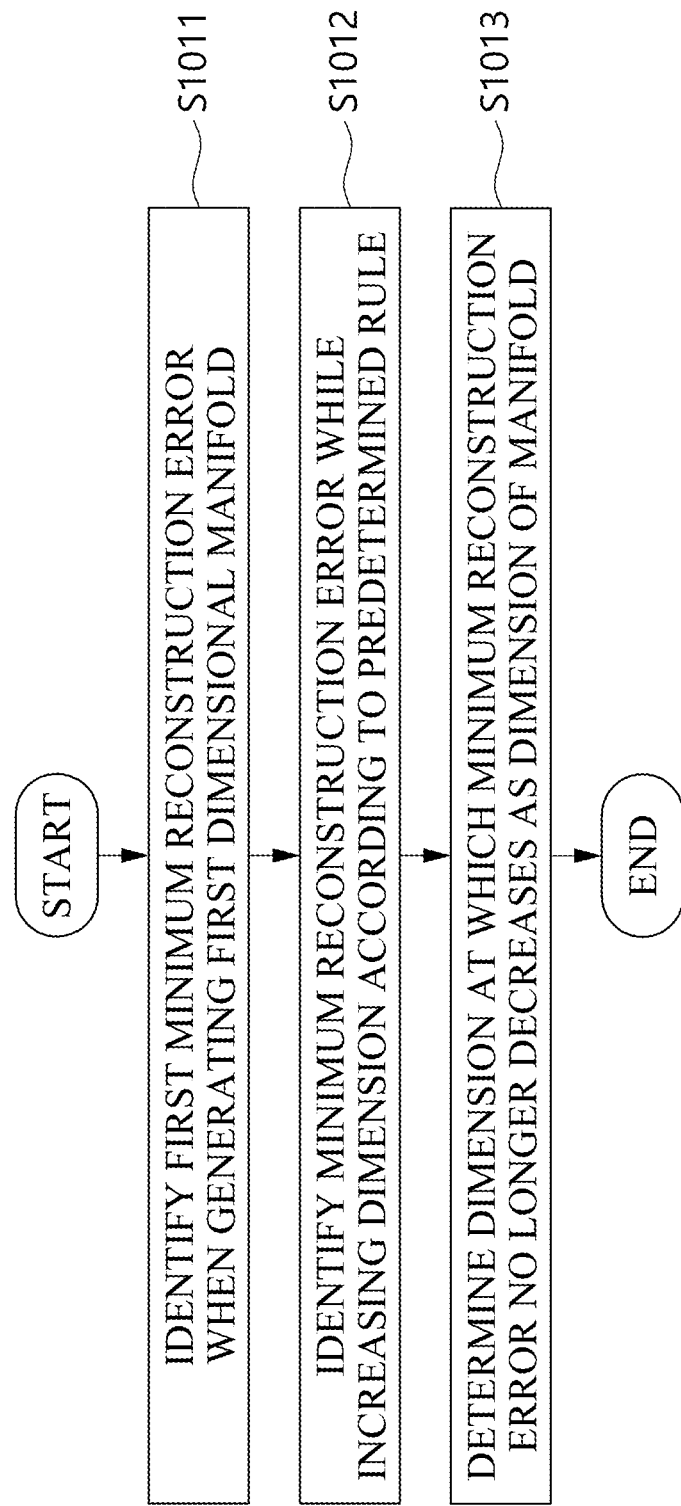
FIG. 9 is a flowchart diagram illustrating an example of a method of determining an optimal dimension of a manifold for data imaging.

FIG. 9 is a flowchart diagram illustrating an example of a method of determining an optimal dimension of a manifold for data imaging.

The computing device may determine an optimal manifold dimension for data imaging based on a minimum reconstruction error according to the dimension of the manifold generated by the model for generating an imaging manifold. In this case, the minimum reconstruction error may mean a reconstruction error value when the training of the model for generating an imaging manifold is completed.

More specifically, the computing device may generate a manifold while increasing a dimension, and may determine a lowest dimension having the minimum reconstruction error value corresponding to the generated manifold as an optimal dimension. As a specific example, as the dimension is increased according to a predetermined rule, the computing device may determine a dimension when the minimum reconstruction error no longer decreases as the optimal dimension of the manifold.

Referring to FIG. 9, the computing device may identify a first minimum reconstruction error when generating a first dimensional manifold (S1011). In this case, the first dimension may be an initial value set for the computing device to perform an algorithm for determining an optimal dimension. For example, when the above-described algorithm is performed, the computing device may initially generate a three-dimensional manifold, but is not limited thereto.

In addition, the computing device may identify the minimum reconstruction error while increasing the dimension according to the predetermined rule (S1012).

In this case, the predetermined rule may mean logic for increasing a dimension pre-stored in the computing device. For example, the computing device may identify the minimum reconstruction error while increasing the dimension of the manifold by a predetermined value (e.g., 1), but is not limited thereto, and identify the minimum reconstruction error while increasing the dimension of the manifold according to a predetermined sequence (e.g., an arithmetic sequence, an equidistant sequence, etc.).

In addition, the present disclosure is not limited thereto, and the predetermined rule may be determined based on the first minimum reconstruction error. More specifically, the computing device may determine an increase in dimension based on whether the first minimum reconstruction error calculated in operation S1011 is greater than or equal to a threshold value. For example, when the first minimum reconstruction error is less than or equal to the threshold value, the computing device may increase a dimension by a first increment to identify the minimum reconstruction error, and when the first minimum reconstruction error is greater than or equal to the threshold value, the computing device may identify the minimum reconstruction error by increasing a dimension by a second increment greater than the first increment.

In addition, the computing device may determine a dimension in which the minimum reconstruction error is no longer reduced as the dimension of the manifold (S1013). Specifically, the computing device may determine, as the dimension of the manifold, a dimension value when the minimum reconstruction error no longer decreases regardless of the increase in the dimension.

In addition, the present disclosure is not limited thereto, and the computing device may determine the dimension of the manifold based on the amount of change of the minimum reconstruction error. Specifically, the computing device may calculate the amount of change of the minimum reconstruction error according to the dimension, and determine the dimension of the manifold by identifying whether the amount of change of the minimum reconstruction error is less than or equal to the threshold value. For example, the computing device may determine, as a manifold to be generated, a dimension value when the amount of change of the minimum reconstruction error is less than or equal to the threshold value.

In addition, the present disclosure is not limited thereto, and the computing device may determine the dimension of the manifold based on an inflection point of the amount of change of the minimum reconstruction error. Specifically, the computing device may determine, as the dimension of the manifold, a dimension value when the amount of change of the minimum reconstruction error increases and then starts to decrease.

In addition, the computing device may store in advance a maximum dimension value in which the manifold is defined. Specifically, after the computing device identifies the minimum reconstruction error while increasing the dimension according to the predetermined rule, when the dimension value reaches the pre-stored maximum dimension value, the computing device may determine the pre-stored maximum dimension value as the dimension of the manifold. In this case, the maximum dimension value may be set in consideration of the processing capacity of the computing device. This is taken into account because a data processing load of the computing device increases when the dimension of the manifold increases.

In addition, the computing device according to various embodiments of the present disclosure may store a dimension value of a manifold suitable for data imaging according to the input data set. Specifically, the dimension value of the manifold determined according to the above-described method and a data set corresponding thereto may be pre-stored. In addition, the dimension value of an arbitrarily determined manifold and a data set corresponding thereto may be pre-stored. In addition, the computing device may store the relationship between the dimension value of the manifold and the input data set in the form of a database.

In addition, the computing device may determine the dimension of the manifold based on the database on the relationship between the dimension value of the manifold and the input data set. Specifically, when the data set is input, the computing device may identify a data set similar to the data set in a database, and select the dimension value of the manifold corresponding to the identified data set. For example, the computing device may identify a data set having a distribution similar to that of the input data set in the database to select a dimension value corresponding thereto, but is not limited thereto. In addition, for example, the computing device may identify a data set having a dimension similar to that of the input data set in the database to select a dimension value corresponding thereto, but is not limited thereto. In addition, for example, the computing device may identify a data set having a distance from the input data set which is less than or equal to a predetermined threshold value to select the dimension value corresponding thereto, but is not limited thereto.

Figure 10:
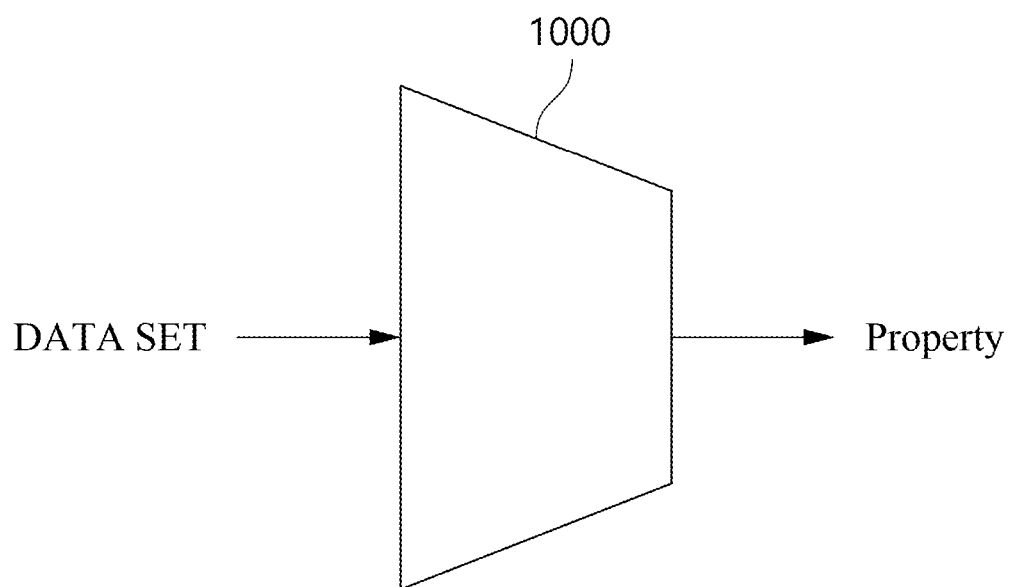
FIG. 10 is a diagram illustrating a method of providing, by a computing device, a property of a data set according to various embodiments of the present disclosure.

FIG. 10 is a diagram illustrating a method of providing, by a computing device, a property of a data set according to various embodiments of the present disclosure.

Referring to FIG. 10, the computing device 1000 may obtain the property of the data set by processing the obtained data set.

In this case, the property of the data set may mean various pieces of information representing the data set. For example, the property of the data set may include, but is not limited to, the density, homogeneity, distribution, or the like of the data set. That is, the property of the data set may mean an intrinsic property such as the density of data that is not related to the task in which the data set is utilized, but is not limited thereto, and may in addition include task-dependent properties such as a percentage of hard-negative that is related to a task (e.g., classification) for which the data set is utilized.

In addition, the computing device may store an operation metric corresponding to each of the properties of the data set in a memory. More specifically, the computing device may store a metric for calculating the density of the data set, a metric for calculating the homogeneity of the data set, a metric for calculating the distribution of the data set, or the like, but is not limited thereto.

In addition, the computing device may obtain the property of the data set based on the stored calculation metric according to a data property mining algorithm constructed with an artificial neural network. Specifically, the property mining algorithm may be implemented as a feed-forward neural network.

For example, the computing device may include a separate neural network for calculating the properties of the data set, or may include a neural network including a layer for calculating the properties of the data set, but is limited thereto.

As an example, the computing device may include an artificial neural network for property mining designed to extract the properties of the data set when receiving the data set. In this case, the artificial neural network for extracting the property may be an artificial neural network that has been transfer-trained to calculate the property of data.

As another example, the computing device may obtain a property of a data set by constructing an artificial neural network in which a layer for data property mining is added to a model for generating an imaging manifold for providing an image of data based on the data set.

Specifically, the computing device may identify a data point set based on the above-described model for generating an imaging manifold based on the obtained data set, and obtain the property of the data set based on the identified data point set.

In this case, the computing device may obtain the property of the data set by processing each data point included in the data point set with a predetermined algorithm. In this case, the computing device may allocate a property value to each data point included in the data point set, and may obtain the property of the data set based on the property values.

In addition, the present disclosure is not limited thereto, and the computing device may obtain the property of the data set by processing the data point set with a predetermined algorithm.

Figure 11:
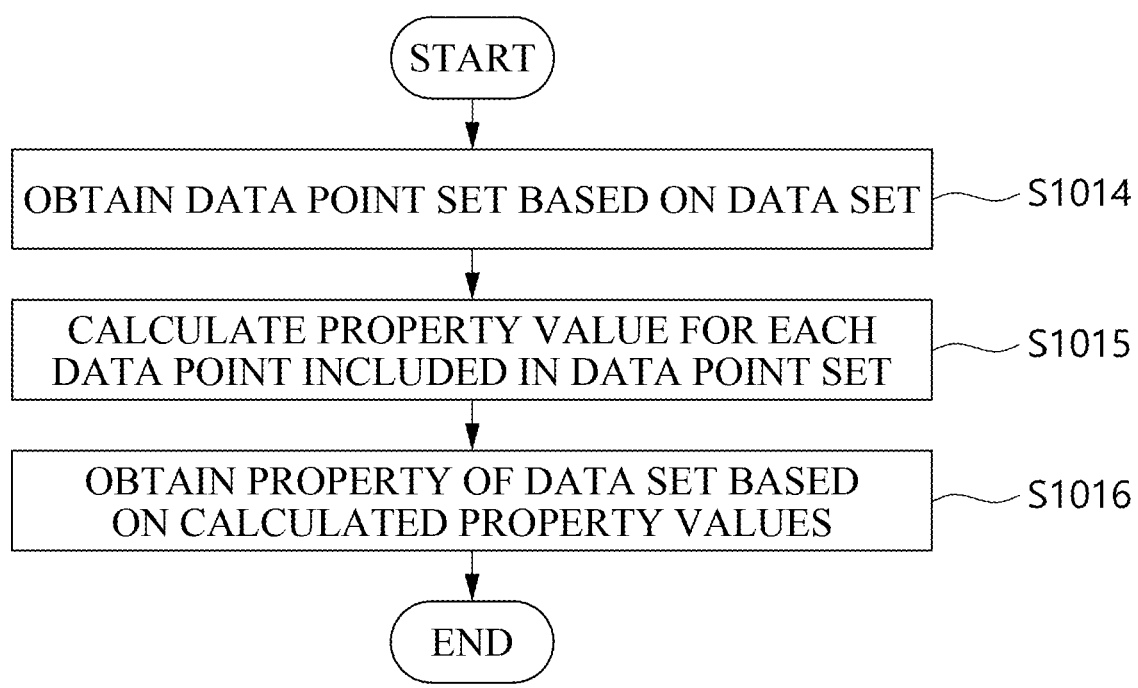
FIG. 11 is a flowchart illustrating a method of identifying, by a computing device, a property of a data set based on data points included in a data point set according to various embodiments of the present disclosure.

FIG. 11 is a flowchart illustrating a method of identifying, by a computing device, a property of a data set based on data points included in a data point set according to various embodiments of the present disclosure.

Figure 12:
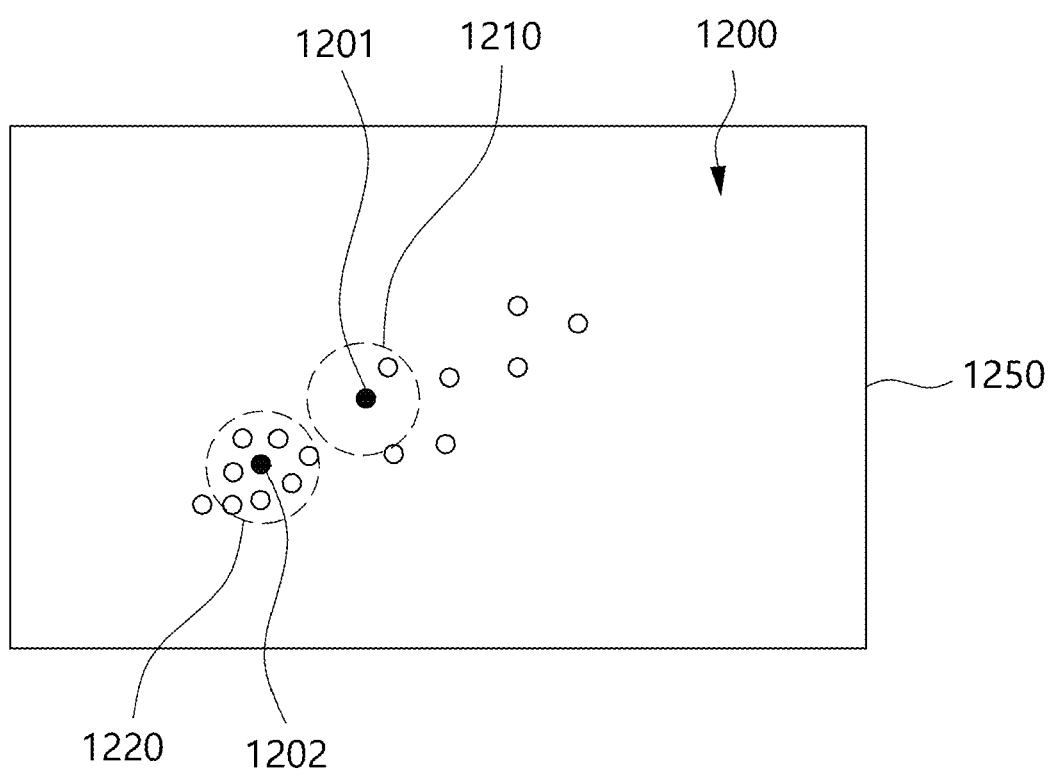
FIG. 12 is a diagram illustrating an example of identifying, by a computing device, a property of a data set based on a data point set according to various embodiments of the present disclosure.

FIG. 12 is a diagram illustrating an example of identifying, by a computing device, a property of a data set based on a data point set according to various embodiments of the present disclosure. A latent space 1250 of FIG. 12 is illustrated as a two-dimensional space for convenience of description, but may actually be a three-dimensional or more manifold space.

Referring to FIG. 11, the computing device may obtain a data point set based on a data set (S1014). In this case, since all the above-described technical features (FIGS. 4 to 9) may be applied to a specific method of obtaining, by a computing device, a data point set, a description thereof will be omitted.

For example, referring to FIG. 12, the computing device may obtain a data point set 1200 defined in the latent space 1250 based on the obtained data set. In this case, the data point set 1200 may include a plurality of data points including a first data point 1201 and a second data point 1202.

In addition, the computing device may calculate a property value for each data point included in the data point set (S1015). In this case, the property value may mean a value that the computing device calculates for a data point in order to obtain the property of the data set. In addition, the property value may be calculated based on a distance between data points included in the data point set. For example, the property value may mean the number of data points present within a predetermined distance with respect to a specific data point, but is not limited thereto. In addition, for example, the property value may mean an average value of distances from a specific data point to the predetermined number of nearby data points, but is not limited thereto.

In addition, referring back to FIG. 12, the computing device may calculate a property value for each data point included in the data point set 1200 according to a predetermined method.

As an example, the computing device may calculate a property value based on the number of data points positioned in regions 1210 and 1220 within a predetermined distance with respect to the specific data point. For example, the computing device may determine the number of data points (e.g., 7) positioned in the first region 1210 within a predetermined distance with respect to the first data point 1201 as a property value of the first data point 1201. In addition, the computing device may determine the number of data points (e.g., 1) positioned in the second region 1220 within a predetermined distance with respect to the second data point 1202 as a property value of the second data point 1202.

As another example, the computing device may calculate a property value based on an average value of distances to the predetermined number of data points close to the specific data point. For example, the computing device may calculate an average distance value based on distance values from the first data point 1201 to K adjacent data points, and use the calculated average distance value as the property value of the first data point 1201, but is not limited thereto.

As another example, the computing device may determine a class classified for each data point included in the data point set 1200 as the property value of the data points. Specifically, when the data set obtained by the computing device includes annotation information, the computing device may determine classes of each data point included in the data point set 1200 obtained based on the data set. In this case, the computing device may obtain property values based on a k-nearest neighbors (k-NN) algorithm, but is not limited thereto.

In addition, referring back to FIG. 11, the computing device may obtain the property of the data set based on the calculated property values (S1016). Specifically, the computing device may obtain an intrinsic property or a task-dependent property of the data set based on the calculated property values. For example, the computing device may obtain the density, homogeneity, class distribution, or the like of a data set based on the property values of each data point, but is not limited thereto.

In addition, the computing device may obtain the property of the data set based on the distribution of the property values of each data point. Specifically, the computing device may obtain the property of the data set based on a statistical distribution such as an average, a deviation, or a variance of each property value of the data points, but is not limited thereto.

For example, referring back to FIG. 12, the computing device may determine an average of property values (for example, the number of data points included in a region within a predetermined distance) of each data point included in the data point set 1200 as the property of the data set.

In addition, for example, the computing device may determine a statistical distribution of classes of each data point included in the data point set 1200 as the property of the data set.

Figure 13:
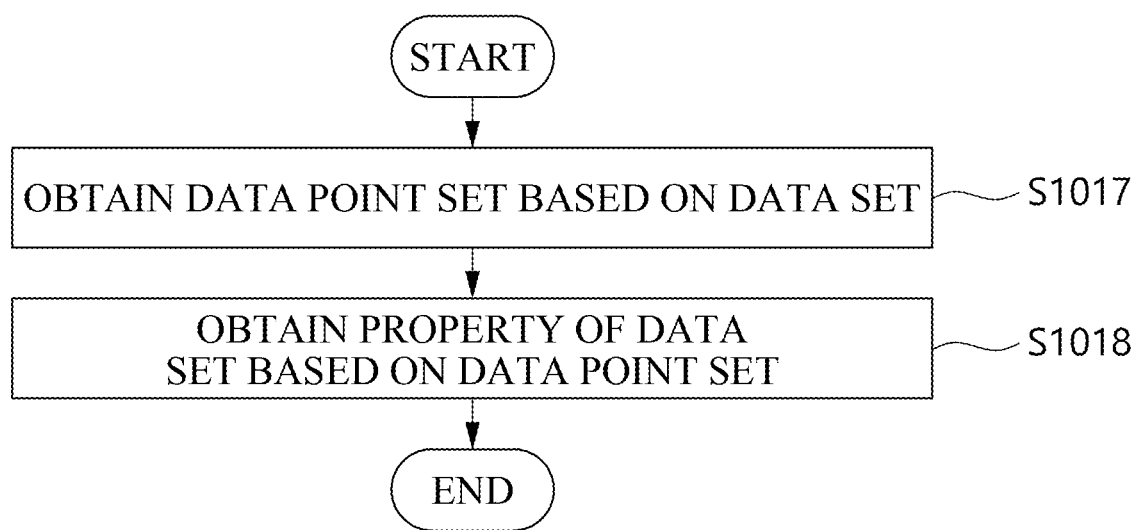
FIG. 13 is a flowchart illustrating a method of identifying, by a computing device, a property of a data set based on a data point set according to various embodiments of the present disclosure.

FIG. 13 is a flowchart illustrating a method of identifying, by a computing device, a property of a data set based on a data point set according to various embodiments of the present disclosure.

Figure 14:
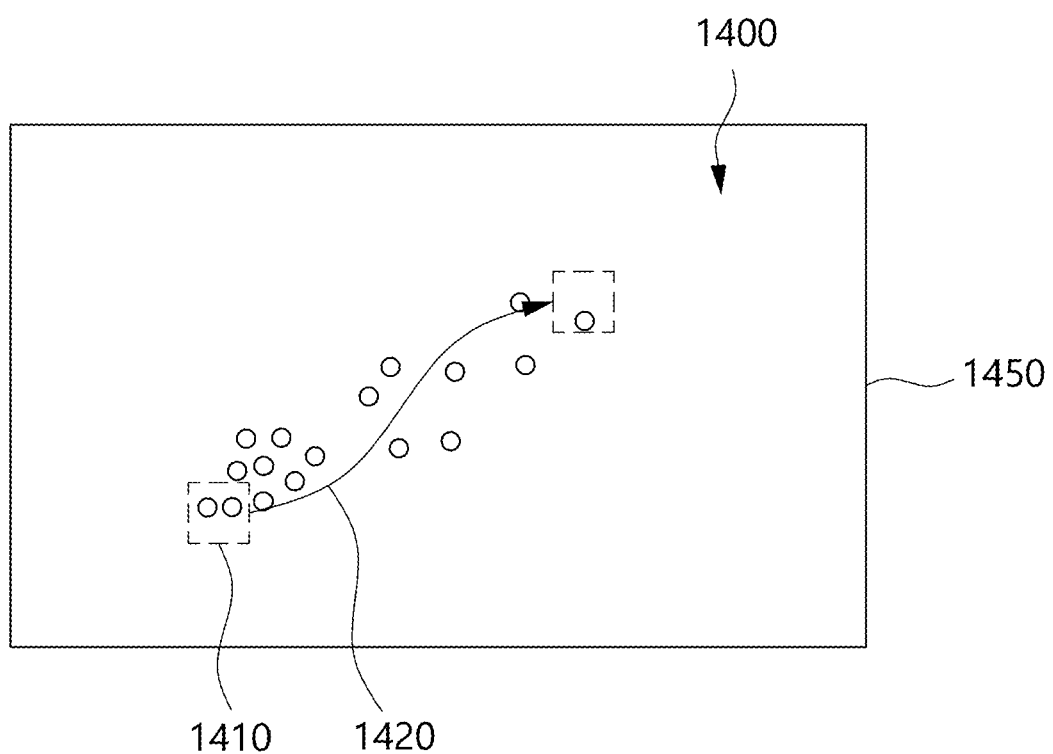
FIG. 14 is a diagram illustrating an example of identifying, by a computing device, a property of a data set based on a data point set according to various embodiments of the present disclosure.

FIG. 14 is a diagram illustrating an example of identifying, by a computing device, a property of a data set based on a data point set according to various embodiments of the present disclosure. A latent space 1450 of FIG. 14 is illustrated as a two-dimensional space for convenience of description, but may actually be a three-dimensional or more manifold space.

Referring to FIG. 13, the computing device may obtain a data point set based on a data set (S1017). In this case, since all the above-described technical features (FIGS. 4 to 9) may be applied to a specific method of obtaining, by a computing device, a data point set, a description thereof will be omitted.

For example, referring to FIG. 14, the computing device may obtain a data point set 1400 defined in the latent space 1450 based on the obtained data set.

In addition, the computing device may obtain the property of the data set based on the data point set (S1018). In this case, the computing device may obtain the property of the data set by processing the data point set according to a predetermined algorithm.

For example, referring back to FIG. 14, the computing device may obtain the property of the data set by processing the data point set 1400 defined in the latent space 1450 according to a predetermined algorithm.

Specifically, the computing device may obtain the property of the data set by processing the data point set 1400 defined in the latent space 1450 based on a pre-stored filter 1410. In this case, the pre-stored filter 1410 may be a filter of a predetermined size (e.g., a 3*3 or 5*5 kernel).

In addition, the computing device may apply the pre-stored filter 1410 along a predetermined path 1420 in the latent space 1450.

In addition, the computing device may obtain the property of the data set by processing the data point set 1400 based on the pre-stored filter 1410 along the entire latent space 1450.

In addition, the computing device may process the data point set 1400 such that the number of data points at a position to which the pre-stored filter 1410 is applied in the data point set 1400 is counted.

For example, the computing device may obtain the property of the data set based on the number of data points included in a region to which the pre-stored filter 1410 is applied.

In addition, as the computing device moves the pre-stored filter 1410 along a predetermined path 1420, the property of the data set may be obtained based on the distribution of the number of data points included in the region to which the pre-stored filter 1410 is applied.

In addition, when the pre-stored filter 1410 is applied along the predetermined path 1420, the computing device may determine a movement range (or stride) of the pre-stored filter 1410. In this case, the movement range of the pre-stored filter 1410 may be predetermined, but is not limited thereto, and may be arbitrarily adjusted.

For example, the computing device may obtain the homogeneity of the data set based on the deviation or variance (statistical distribution) of the number of data points included in the region to which the pre-stored filter 1410 is applied. In this case, the homogeneity of the data set may appear as a specific result value based on a lookup table previously stored in the computing device, but is not limited thereto.

In addition, the computing device may pre-process the data point set 1400 to obtain the information on the positions where the data points are present. In this case, the computing device may apply the pre-stored filter 1410 only to a region corresponding to the positions where the data points are present in the latent space 1450.

In addition, the computing device may apply the pre-stored filter 1410 along the predetermined path 1420 defined in a region corresponding to the positions where the data points are present in the latent space 1450.

As a specific example, the computing device may obtain a feature map related to a property of a data set using a convolution algorithm based on a kernel.

Figure 15:
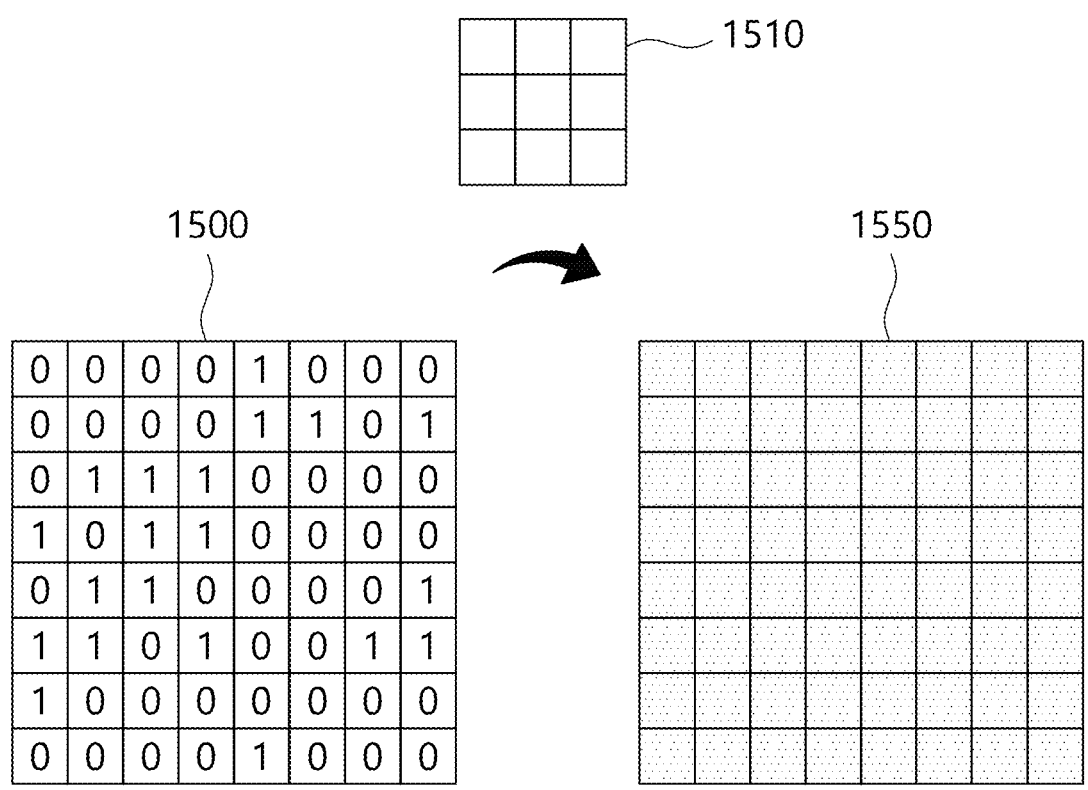
FIG. 15 is a diagram for describing a method of obtaining, by a computing device, a property of a data set using a convolution algorithm according to various embodiments of the present disclosure.

FIG. 15 is a diagram for describing a method of obtaining, by a computing device, a property of a data set using a convolution algorithm according to various embodiments of the present disclosure.

Referring to FIG. 15, the computing device may represent the above-described data point set (see reference numeral 1400 of FIG. 14) as a point image 1500 defined by a plurality of unique values. In this case, the plurality of unique values may be values allocated based on whether the data point is present at each position in the above-described latent space (see reference numeral 1450 in FIG. 14). For example, the point image 1500 may be identified by expressing a position where the data point is present as 1 and a position where the data point is not present as 0, but is not limited thereto.

In addition, a size (or dimension) of the point image 1500 may correspond to the size (or dimension) of the latent space 1450 described above. In FIG. 15, the point image 1500 is illustrated in a two-dimensional space for convenience of description, but in reality, may be a three-dimensional or higher image.

In addition, the computing device may process the point image 1500 by applying the pre-stored kernel 1510 to obtain a feature map 1550 related to a property of a data set.

Specifically, the computing device may calculate an output value by convolving the point image 1500 based on the pre-stored kernel 1510, and obtain a feature map 1550 based on the calculated output values.

In this case, the pre-stored kernel 1510 may be designed to determine the distribution of the data set. Specifically, the pre-stored kernel 1510 may be a kernel designed to output a feature map 1550 related to the distribution of the input point image 1500.

Accordingly, the feature map 1550 may be related to the property of the data set. For example, the feature map 1550 related to the property of the data set may be a feature map representing the distribution, density, or homogeneity of the data set.

The computing device according to various embodiments of the present disclosure may obtain a data set and process the obtained data set to modify the data set. Here, the modification of the data set may mean providing a method of modifying the quality of data set, which will be described below (FIGS. 25 and 26), and specifically, may mean providing a method of modifying a data set into a form more suitable for deep learning model training. For example, the computing device may modify data by providing a method of making a distribution of a data set more uniform, but is not limited thereto.

For example, the computing device may modify the data set based on the property of the data set obtained by the above-described method.

Figure 16:
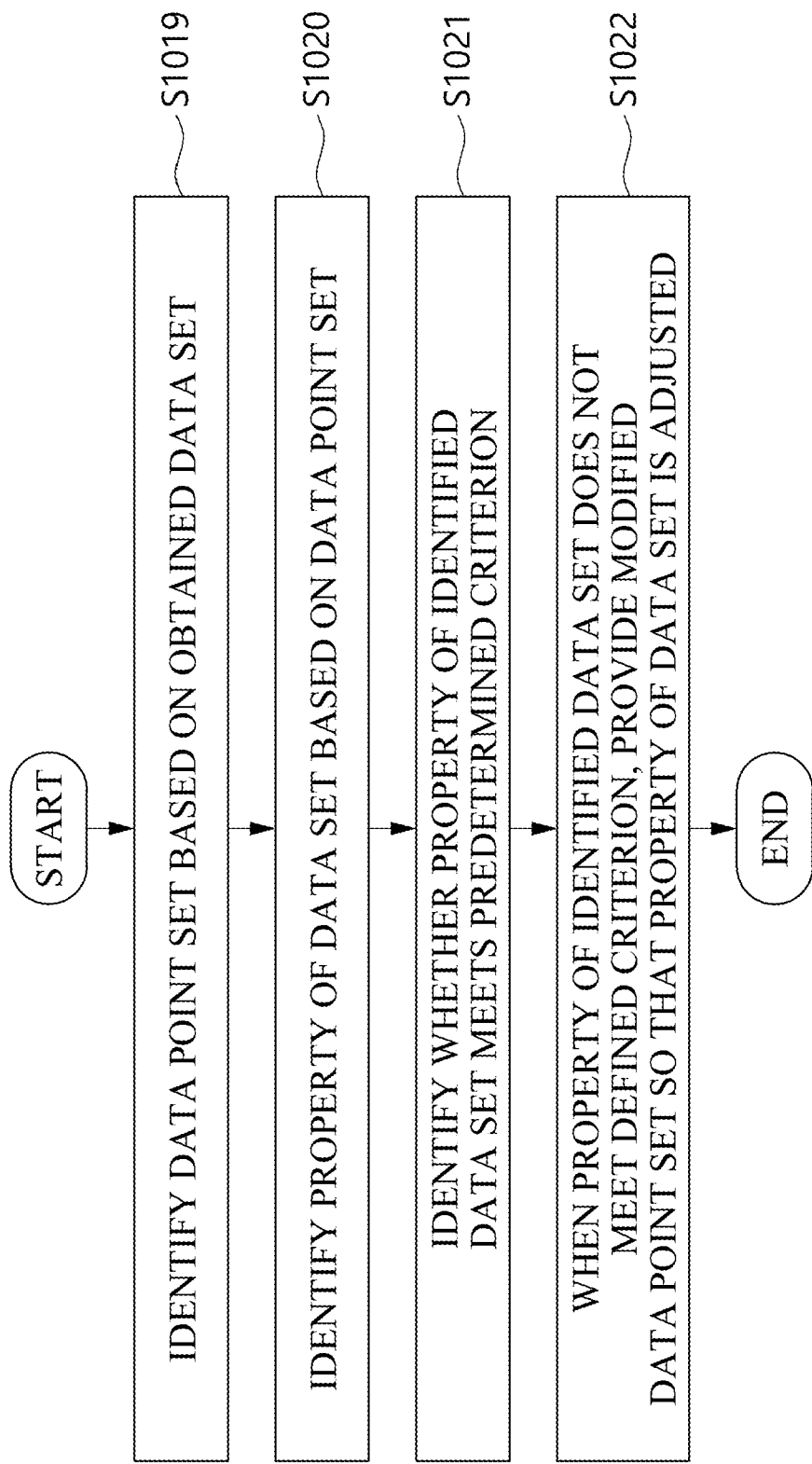
FIG. 16 is a diagram for describing a method of modifying, by a computing device, a data set according to various embodiments of the present disclosure.

FIG. 16 is a diagram for describing a method of modifying, by a computing device, a data set according to various embodiments of the present disclosure.

Referring to FIG. 16, the computing device may identify the data point set based on the input data set (S1019). In this case, since all the above-described technical features (FIGS. 4 to 9) may be applied to a specific method of obtaining, by a computing device, a data set and identifying a data point set, a description thereof will be omitted.

In addition, the computing device may obtain the property of the data set based on the data point set (S1020). In this case, since all the above-described technical features (FIGS. 10 to 15) may be applied to a specific method of obtaining, by a computing device, a data point set, a description thereof will be omitted.

In addition, the computing device may identify whether the property of the identified data set meets a predetermined criterion (S1021). In this case, the predetermined criterion may be related to whether the data set needs to be modified. For example, the computing device may determine whether the distribution of the data set identified based on the data point set meets a predetermined criterion.

In addition, when the property of the identified data set does not meet the predetermined criterion, the computing device may provide the modified data point set so that the property of the data set is adjusted (S1022). For example, the computing device may adjust at least one data point included in the data point set, delete at least one data point, or add at least one data point to the data point set to provide the modified data point set, but is not limited thereto.

A specific example of providing, by the computing device, the modified data point set will be described in more detail with reference to FIGS. 17 and 18.

Figure 17:
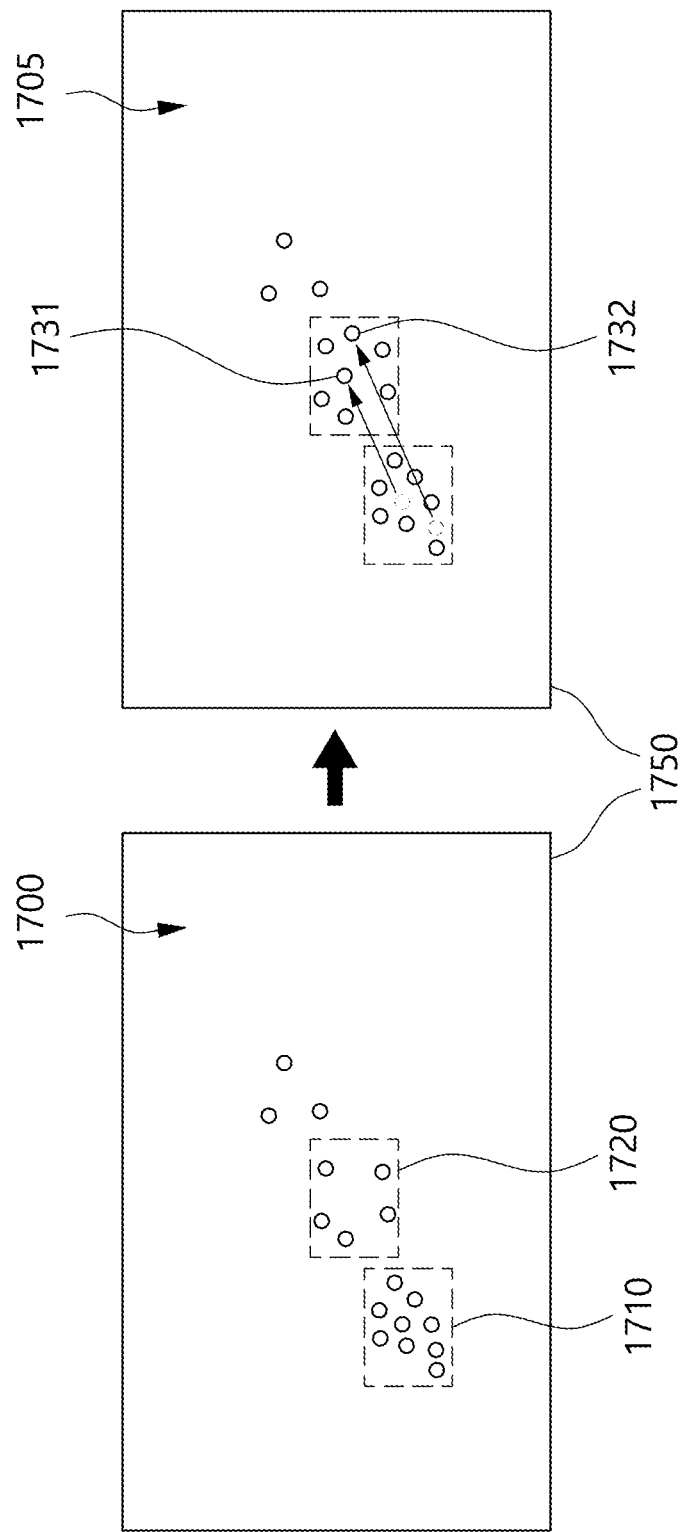
FIG. 17 is a diagram illustrating an example of generating, by a computing device, a modified data point set according to various embodiments of the present disclosure.

FIG. 17 is a diagram illustrating an example of generating, by a computing device, a modified data point set according to various embodiments of the present disclosure. A latent space 1750 of FIG. 17 is illustrated as a two-dimensional space for convenience of description, but may actually be a three-dimensional or more manifold space.

Referring to FIG. 17, the computing device may obtain a modified data point set 1705 by adjusting at least one data point included in the data point set 1700.

In this case, the computing device may determine whether the property of the data set identified based on the data point set 1700 meets a predetermined criterion. More specifically, the computing device may identify whether the property of the data set meets the predetermined criterion based on the data points included in two or more regions 1710 and 1720 in the latent space 1750 in which the data point set 1700 is defined. In this case, the sizes of the two or more regions 1710 and 1720 may both be the same, but are not limited thereto, and may be different from each other. In addition, the at least one region 1710 or 1720 may be arbitrarily selected, but is not limited thereto, and may be preset to a fixed position. In addition, the at least one region 1710 or 1720 may mean a region to which the filter or kernel of FIGS. 14 and 15 is applied.

For example, when the difference between the number of data points included in the first region 1710 in the latent space 1750 and the number of data points included in the second region 1720 in the latent space 1750 is greater than or equal to a predetermined criterion, the computing device may adjust at least one data point included in the data point set.

Specifically, when the difference between the number of data points included in the first region 1710 (e.g., 9) and the number of data points included in the second region 1720 (e.g., 5) is greater than or equal to a threshold value, the computing device may adjust at least one data point included in the data point set 1700 (e.g., a position in the latent space is adjusted).

In addition, for example, when the difference between the average value of the number of data points included in at least one region 1710 or 1720 in the latent space 1750 and the number of data points in a specific region is greater than or equal to a threshold value, the computing device may adjust at least one data point included in the data point set 1700.

In addition, the computing device may obtain the modified data point set 1705 by adjusting a position in the latent space 1750 of at least one data point included in the data point set 1700. For example, the computing device may obtain the modified data point set 1705 by adjusting a first data point 1731 and a second data point 1732 defined at positions in the first region 1710 to specific positions in the second region 1720.

In addition, the computing device may determine a position where the data point is to be adjusted in the latent space according to a predetermined criterion. More specifically, the computing device may determine positions where the first data point 1731 and the second data point 1732 are to be adjusted based on the distribution of the data point set 1700. For example, the computing device may determine positions where the first data point 1731 and the second data point 1732 are to be adjusted so that the points are uniformly positioned on the second region 1720. As a specific example, the computing device may move at least one of the first data point 1731 and the second data point 1732 to an intermediate position between at least two data points that are far apart from each other among the data points included in the second region 1720, but is not limited thereto.

In addition, the computing device may determine the number of data points to be adjusted in the data point set 1700 so that the distribution of the data point set 1700 is constant.

Figure 18:
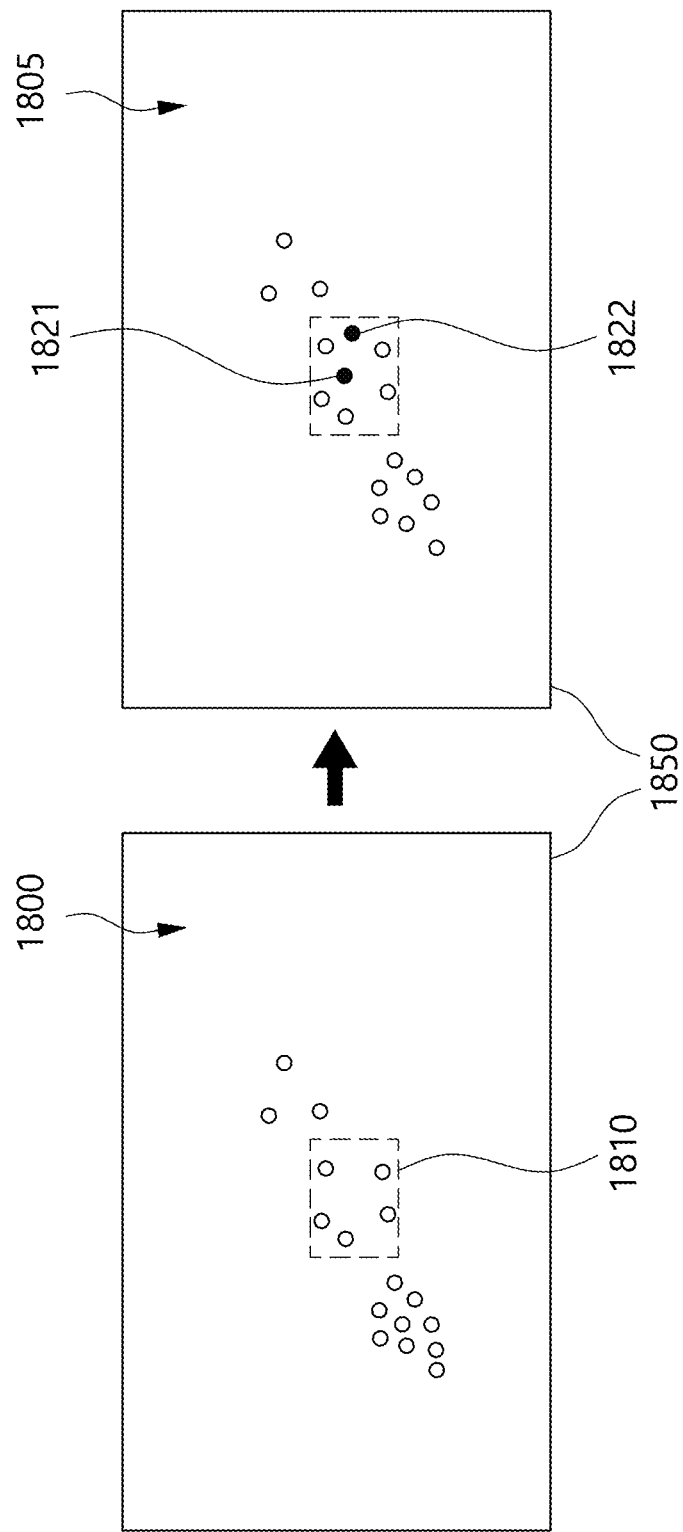
FIG. 18 is a diagram illustrating another example of generating, by a computing device, a modified data point set according to various embodiments of the present disclosure.

FIG. 18 is a diagram illustrating another example of generating, by a computing device, a modified data point set according to various embodiments of the present disclosure. A latent space 1850 of FIG. 18 is illustrated as a two-dimensional space for convenience of description, but may actually be a three-dimensional or more manifold space.

Referring to FIG. 18, the computing device may obtain a modified data point set 1805 by adding at least one data point to the data point set 1800.

In this case, all the technical features described in FIG. 17 may be applied to the predetermined criterion for the computing device to generate the modified data point set.

For example, the computing device may obtain the modified data point set 1805 by adding a data point to a third region 1810 in which the number of data points does not meet the predetermined criterion in the latent space 1850. Specifically, the computing device may obtain the modified data point set 1805 by adding a third data point 1821 and a fourth data point 1822 to arbitrary positions in the third region 1810.

In addition, the computing device may determine a position where the data point is to be added on the latent space according to the predetermined criterion. More specifically, the computing device may determine positions where the third data point 1821 and the fourth data point 1822 are to be added based on the distribution of the data point set 1800. For example, the computing device may determine positions where the third data point 1821 and the fourth data point 1822 are to be added so that the points are uniformly positioned on the third region 1810. As a specific example, the computing device may add at least one of the third data point 1821 and the fourth data point 1822 to an intermediate position between at least two data points that are far apart from each other among the data points included in the third region 1810, but is not limited thereto.

In addition, the computing device may determine the number of data points to be added in the data point set 1800 so that the distribution of the data point set 1800 is constant.

In addition, the present disclosure is not limited thereto, and the computing device may obtain the modified data point set by removing at least some of the data points included in the data point set. Specifically, the computing device may obtain a modified data point set by removing at least one data point determined in a predetermined manner among the data points included in the data point set based on the data set.

For example, the computing device may remove at least some of the data points included in a region where data is excessively concentrated in the data point set. Specifically, the computing device may select a region including a predetermined number or more of data points in a manifold region in which the data point set is defined, and remove at least one data point included in the selected region to obtain the modified data point set.

As described above, the computing device may add, adjust, or remove data points to correct the property of the data set determined based on the data point set (or manifold) in a direction suitable for training the deep learning model to modify the data set.

The computing device according to various embodiments of the present disclosure may perform the above-described data modification algorithm using the deep learning model. In the present specification, the deep learning model for performing the data modification algorithm is referred to as a "model for generating a modified manifold)."

Figure 19:
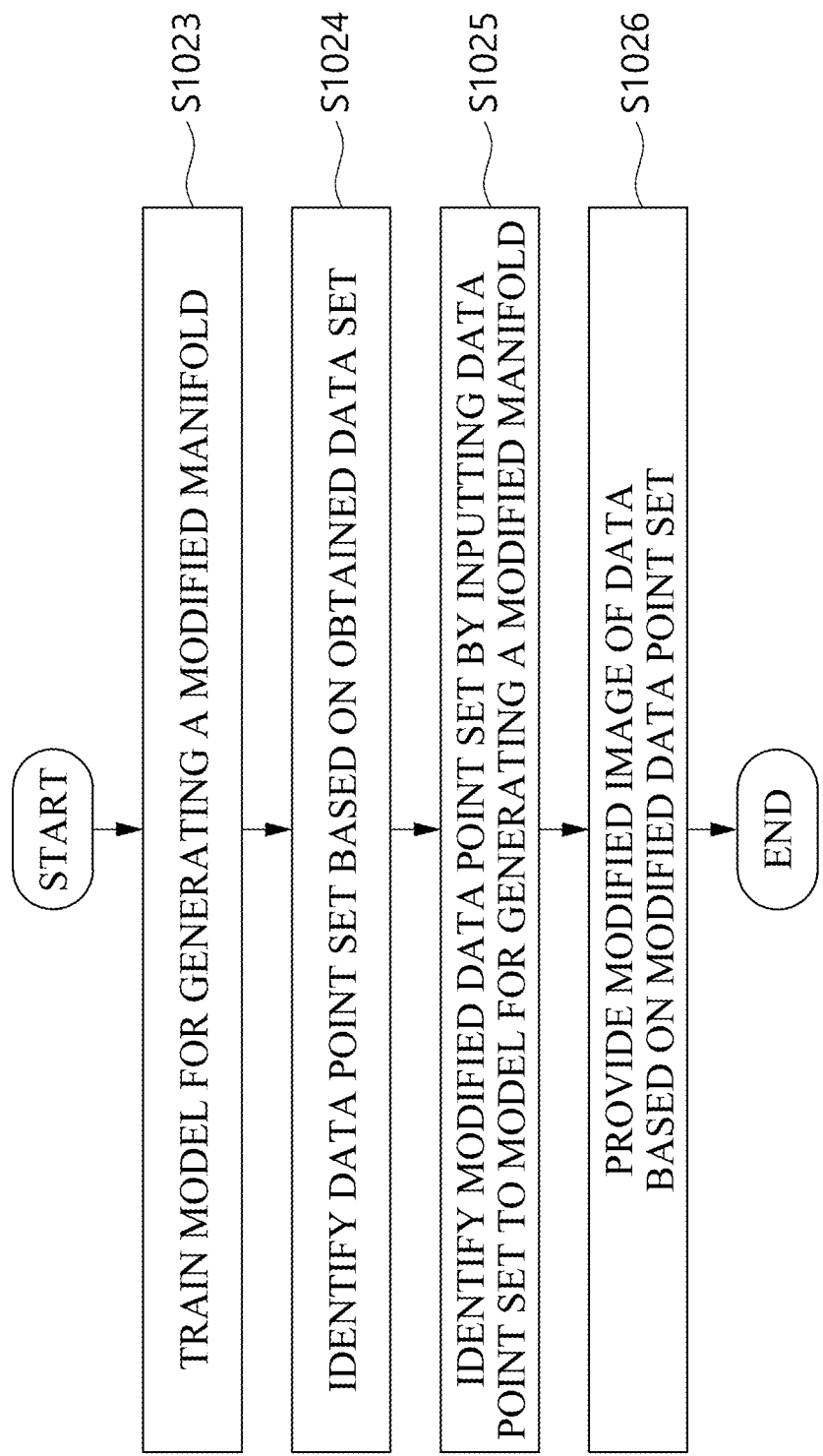
FIG. 19 is a diagram for describing a method of providing, by a computing device, a modified image of data by training a model for generating a modified manifold according to various embodiments of the present disclosure.

FIG. 19 is a diagram for describing a method of providing, by a computing device, a modified image of data by training a model for generating a modified manifold according to various embodiments of the present disclosure.

Referring to FIG. 19, the computing device may train a model for generating a modified manifold (S1023). A specific method of training a model for generating a modified manifold will be described in detail with reference to FIGS. 20 to 22.

In addition, the computing device may identify a data point set based on the obtained data set (S1024). In this case, since all the above-described technical features (FIGS. 4 to 9) may be applied to a specific method of obtaining, by a computing device, a data point set, a description thereof will be omitted.

In addition, the computing device may identify the modified data point set by inputting the data point set to the model for generating a modified manifold (S1025). Specifically, the computing device may obtain a modified data point set in which a distance relationship between data points included in the data point set is adjusted using the model for generating a modified manifold.

In addition, the computing device may provide a modified image of data based on the modified data point set (S1026). Since all the above-described technical features (FIGS. 4 to 9) may be applied to a specific method of providing, by the computing device, a modified image of data based on the modified data point set, a description thereof will be omitted.

Figure 20:
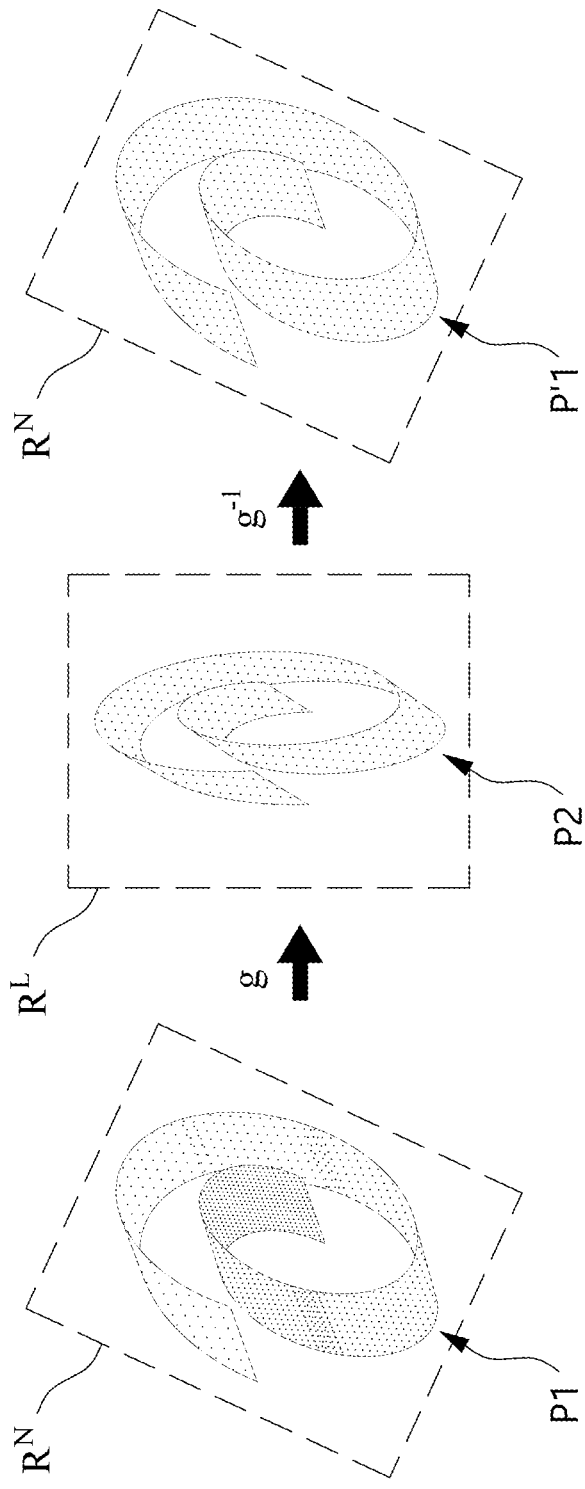
FIG. 20 is a diagram illustrating an example of training, by a computing device, a model for generating a modified manifold according to various embodiments of the present disclosure.

FIG. 20 is a diagram illustrating an example of training, by a computing device, a model for generating a modified manifold according to various embodiments of the present disclosure.

The computing device 1000 may train a model for generating a modified manifold in order to provide a method of modifying the obtained data set into a form more suitable for the deep learning model.

Referring to FIG. 20, the computing device 1000 may identify the first data point set P1 defined in the N-dimensional first embedding space $R^N$ based on the obtained data set. In this case, since all the above-described technical features (FIGS. 4 to 9) may be applied to a specific method of identifying the first data point set, a description thereof will be omitted. In this case, the first data point set P1 may be identified by defining an N-dimensional first manifold space.

In addition, the computing device 1000 may identify a second data point set P2 based on the first data point set P1. In this case, the second data point set P2 may be identified by defining an L-dimensional second manifold space. Specifically, the computing device 1000 may obtain the second data point set P2 by representing the first data point set P1 in an L-dimensional second embedding space $R^L$.

In addition, the computing device 1000 may obtain the second data point set P2 by processing the first data point set P1 according to a predetermined condition. Specifically, the computing device 1000 may obtain the second data point set P2 by mapping the first data point set P1 to the L-dimensional second embedding space R L based on a predetermined condition (e.g., a matrix pre-stored for mapping to an embedding space of a specific dimension) defined by a mapping function g. For example, the computing device 1000 may obtain the second data point set P2 by encoding the first data point set P1, but is not limited thereto.

In addition, the computing device 1000 may obtain a modified first data point set P'1 based on the second data point set P2. In this case, the modified first data point set P'1 may be defined in the same N-dimensional first embedding space $R^N$ as the first data point set P1.

In addition, the computing device 1000 may obtain the modified first data point set P'1 by processing the second data point set P2 according to a predetermined condition. Specifically, the computing device may obtain the modified first data point set P'1 by reconstructing the second data point set P2 on the N-dimensional first embedding space $R^N$ based on a predetermined condition (e.g., an inverse matrix of a matrix pre-stored for mapping to an embedding space of a specific dimension) defined as an inverse function $g^{-1}$ of the mapping function g.

In addition, the computing device 1000 may obtain the modified first data point set P'1 so that a distance relationship between data points included in the first data point set P1 is adjusted. In other words, the computing device 1000 may train the model for generating a modified manifold so that the distance relationship between the data points included in the first data point set P1 is adjusted.

In addition, the computing device 1000 may adjust the distance relationship between the data points so that the distribution of the first data point set P1 is improved. More specifically, the computing device 1000 may adjust the distance relationship between the data points by moving data points positioned in a region with a high density of data points to a region with a low density of data points in the first data point set P1.

In addition, the computing device 1000 may train the model for generating a modified manifold based on a loss function defined based on distances of data points included in the first data point set P1. For example, the computing device 1000 may train the model for generating a modified manifold to extract at least a pair of data points whose distance relationship needs to be adjusted among the data points included in the first data point set P1. In addition, for example, the computing device 1000 may train the model for generating a modified manifold to add (or synthesize) data points to a region in which the distance relationship needs to be adjusted in the first data point set P1.

Figure 21:
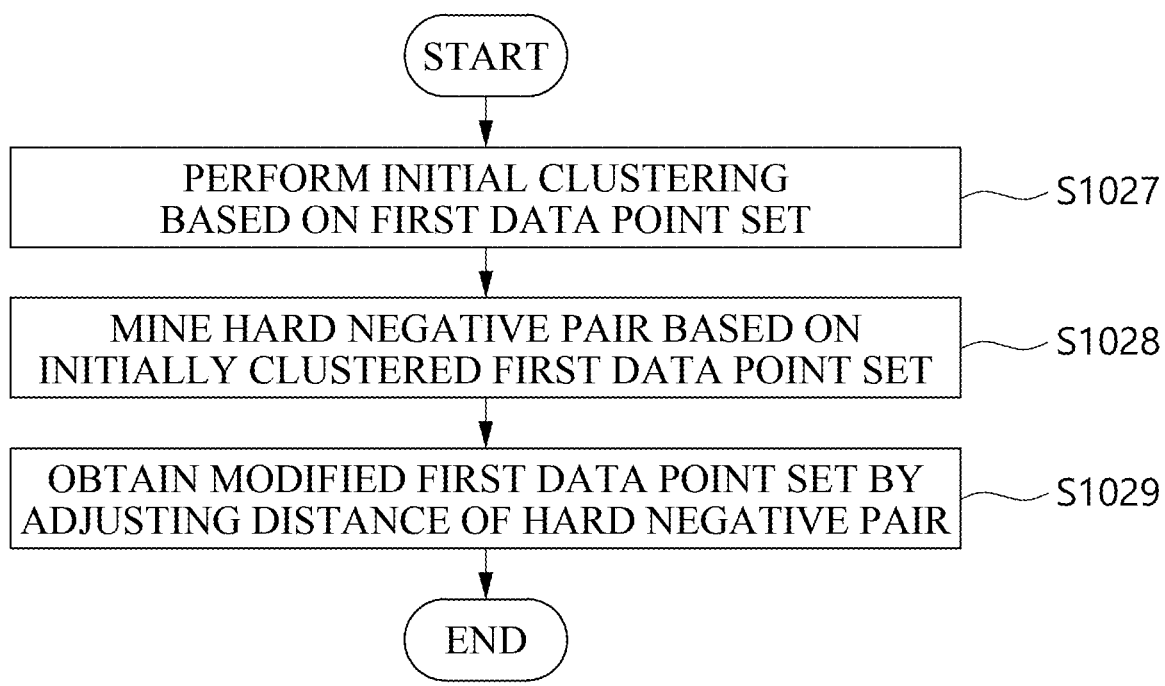
FIG. 21 is a flowchart for describing an example of a method of training, by a computing device, a model for generating a modified manifold according to various embodiments of the present disclosure.

FIG. 21 is a flowchart for describing an example of a method of training, by a computing device, a model for generating a modified manifold according to various embodiments of the present disclosure.

Figure 22:
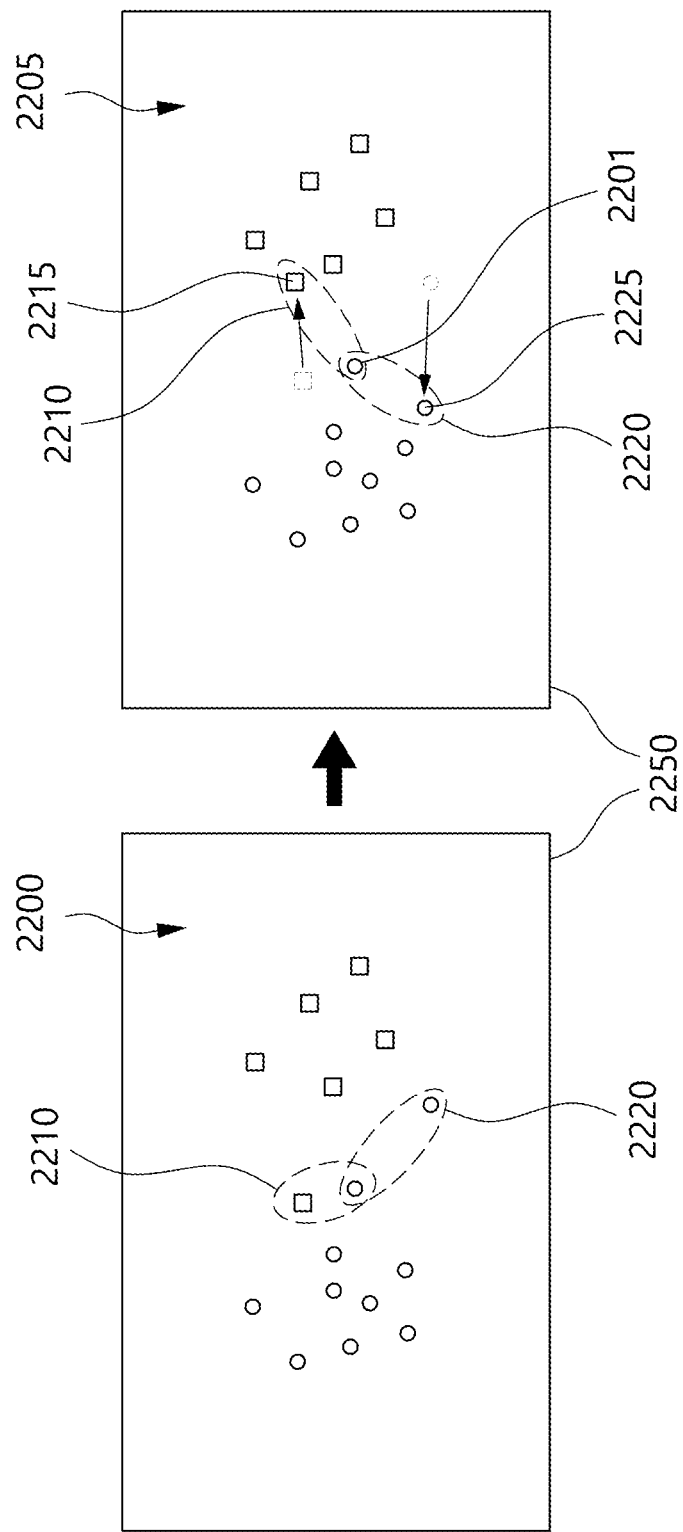
FIG. 22 is a diagram illustrating a method of training, by a computing device, a model for generating a modified manifold by mining a hard negative pair according to various embodiments of the present disclosure.

FIG. 22 is a diagram illustrating a method of training, by a computing device, a model for generating a modified manifold by mining a hard negative pair according to various embodiments of the present disclosure. A latent space 2250 of FIG. 22 is illustrated as a two-dimensional space for convenience of description, but may actually be a three-dimensional or more manifold space.

Referring to FIG. 21, the computing device may perform initial clustering based on the first data point set (S1027). In this case, the initial clustering means clustering a plurality of data points included in the first data point set into at least one group. Specifically, for the plurality of data points included in the first data point set, the computing device may cluster the plurality of data points into at least one group based on a similarity of data corresponding to the plurality of data points.

In addition, the computing device may perform initial clustering based on similarity information on the first data point set. In this case, in order to obtain the similarity information, the computing device may obtain the similarity information from the outside or generate the similarity information.

For example, the computing device may receive the similarity information on the first data point set from the outside. Specifically, the computing device may receive information on the similarity of two or more data points included in the first data point set from a user. That is, the user may input whether two or more data points in the first data point set identified by the computing device are similar. For example, the computing device may cluster the first data point set into at least one group based on annotation information on the data set received from the outside, but is not limited thereto.

As another example, the computing device may obtain the similarity information on the first data point set through unsupervised learning. Specifically, the computing device may cluster the first data point set into one or more groups by self-learning the similarity between the data points included in the first data point set. In addition, the similarity information on the first data point set may be identified based on property values of data points included in the first data point set. Specifically, the computing device may determine that the more similar the property values between the data points, the higher the similarity.

As a specific example, referring to FIG. 22, the computing device may perform initial clustering based on a first data point set 2200. Specifically, the computing device may cluster the first data point set 2200 into a first group including a first data point 2215 and a second group including a second data point 2225. In this case, the data points included in the same group may have similar characteristics (positive). In addition, the data points included in the first group and the data points included in the second group may have different characteristics (negative). For example, the data points included in the same group may be data on the latent space 2250 capable of deriving a similar result when performing a specific task, but is not limited thereto. In FIG. 22, the data points included in the first group are represented by a circular point and the data points included in the second group are represented by a square point, but this is only an exemplary representation, and the present disclosure is not intended to be limited to the representation in the drawings.

In the present disclosure, a pair of data points clustered in different groups is defined as a negative pair, and a pair of data points clustered in the same group is defined as a positive pair.

In addition, referring back to FIG. 21, the computing device may perform hard negative pair mining based on the initially clustered first data point set (S1028). Here, the hard negative pair means a negative pair that is difficult to distinguish from each other due to being close to each other among the above-described negative pairs.

Specifically, the computing device may mine the hard negative pair based on the distance relationship of the clustered first data point set.

For example, when there is a negative data point having a distance from a specific data point which is less than or equal to a threshold value among data points included in a group different from the specific data point, the computing device may determine the specific data point and the negative data point as a hard negative pair.

As another example, when a negative data point included in another group is positioned closer to the specific data point than a positive data point included in the same group, the computing device may determine the specific data point and the negative data point as a hard negative pair.

In addition, the computing device may mine a positive pair positioned far from each other in the latent space despite being in the same group.

For example, when there is a positive data point having a distance from a specific data point which is greater than or equal to a threshold value among data points included in the same group as the specific data point, the computing device may determine the specific data point and the positive data point as a positive pair.

As another example, when a negative data point included in another group is positioned closer to a specific data point than a positive data point included in the same group, the computing device may determine the specific data point and the positive data point as a positive pair.

As a specific example, referring back to FIG. 22, the computing device may mine the hard negative pair and the positive pair based on the similarity and distance relationship between the data points included in the first data point set 2200 defined in the latent space 2250.

Specifically, the computing device may identify the first data point 2215 that is included in a group different from a reference data point 2201 but satisfies the predetermined distance condition to mine the hard negative pair to determine the reference data point 2201 and the first data point 2215 as a hard negative pair 2210. In addition, the computing device may identify the second data point 2225 that is included in a group different from the reference data point 2201 but satisfies the predetermined distance condition to mine the positive pair, thereby determining the reference data point 2201 and the second data point 2225 as a positive pair 2220.

In addition, referring back to FIG. 21, the computing device may obtain a modified first data point set by adjusting the distance between the mined hard negative pairs (S1029). Specifically, the computing device may adjust the position in the latent space of at least one data point included in the first data point set so that the hard negative pair becomes an easy negative pair. In this case, the easy negative pair means a negative pair that is easy to distinguish from each other due to being far from each other among the above-described negative pairs.

In addition, the computing device may obtain the modified first data point set by adjusting a distance between the mined positive pairs. Specifically, the computing device may adjust a position in a latent space of at least one data point included in the first data point set so that the distance between the positive pairs is smaller than a predetermined distance.

As a specific example, referring back to FIG. 22, the computing device may adjust the position in the latent space 2250 of the first data point 2215 identified as the hard negative pair with respect to the reference data point 2201 to obtain the modified first data point set 2205.

In addition, the computing device may adjust the position in the latent space 2250 of the first data point 2215 identified as the positive pair with respect to the reference data point 2201 to obtain the modified first data point set 2205.

In addition, the present disclosure is not limited thereto, and operations S1028 and S1029 of FIG. 21 may be replaced with the following operation(s).

For example, the computing device may obtain the modified first data point set by adding at least one data point to the initially clustered first data point set. In this case, the computing device may adjust the distance relationship between the data points included in the first data point set by adding the at least one data point.

As a specific example, the computing device may determine a region of interest (ROI) that needs to adjust the distance relationship based on the initially clustered first data point set. In this case, the ROI may be a region including the above-described hard negative pair. In this case, the computing device may adjust a distance relationship between the ROI and data points positioned around the ROI by generating at least one data point in at least a portion of the ROI. For example, the computing device may generate at least one data point in the region between the hard negative pairs on the ROI including the hard negative pair to perform the adjustment so that the distance between the hard negative pairs increases.

Figure 23:
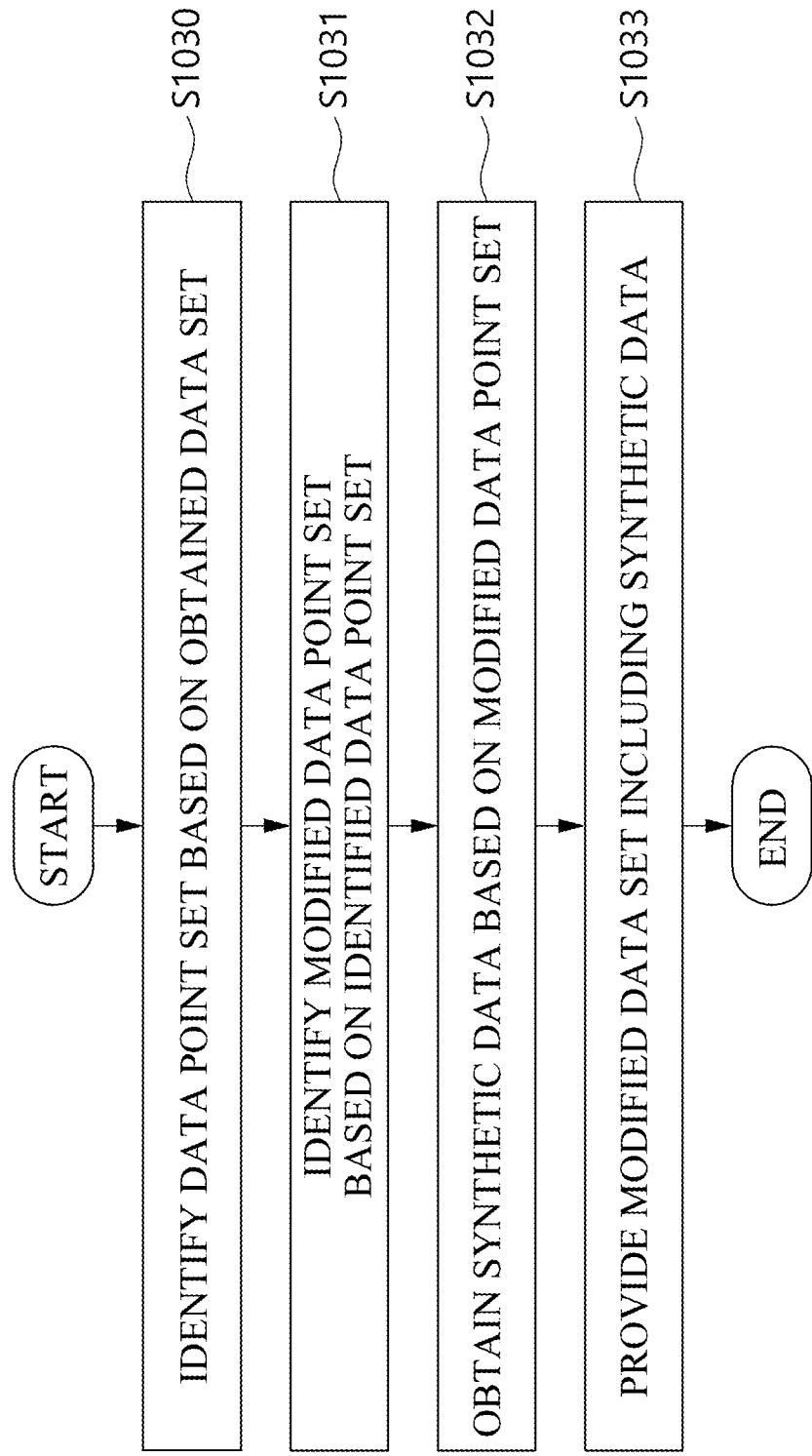
FIG. 23 is a diagram illustrating an operation of providing, by a computing device, a modified data set including synthetic data based on a data set according to various embodiments of the present disclosure.

FIG. 23 is a diagram illustrating an operation of providing, by a computing device, a modified data set including synthetic data based on a data set according to various embodiments of the present disclosure.

Figure 24:
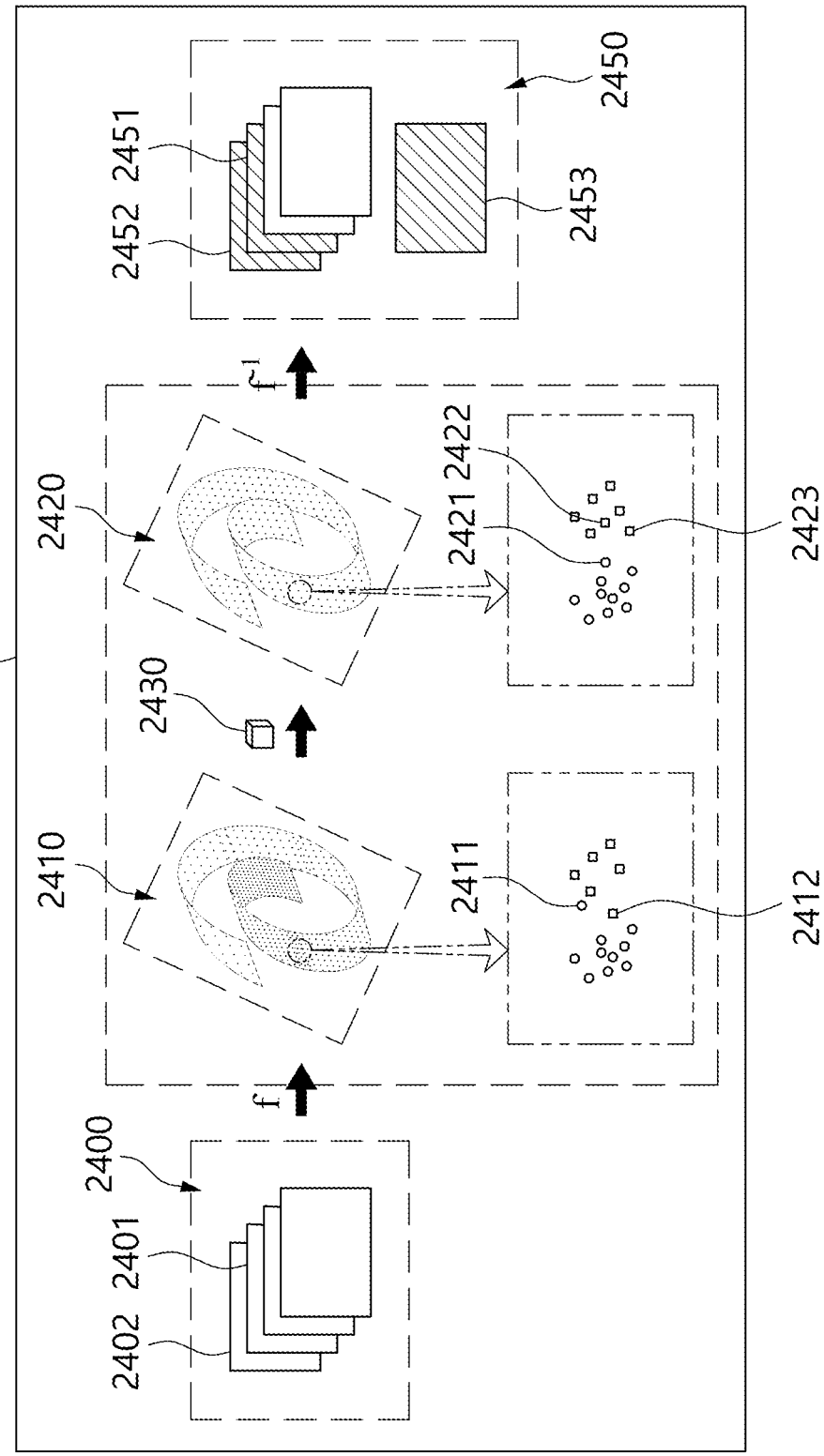
FIG. 24 is a diagram illustrating an example of an operation of providing, by a computing device, a modified data set including synthetic data based on a data set according to various embodiments of the present disclosure.

FIG. 24 is a diagram illustrating an example of an operation of providing, by a computing device, a modified data set including synthetic data based on a data set according to various embodiments of the present disclosure.

Referring to FIG. 23, the computing device may identify the data point set based on the obtained data set (S1030). In addition, the computing device may identify the modified data point set based on the identified data point set (S1031). In this case, since all the above-described technical features (FIGS. 16 to 22) may be applied to operations S1030 and S1031, a detailed description thereof will be omitted.

As a specific example, referring to FIG. 24, the computing device 1000 may identify a data point set 2410 based on the obtained data set 2400. In this case, the computing device 1000 may obtain the data point set 2410 by mapping the data set 2400 into a latent space based on a predetermined mapping function f. In this case, the data point set 2410 may include a first data point 2411 and a second data point 2412. For example, the first data point 2411 and the second data point 2412 may be data clustered into different groups, but is not limited thereto, and may be data that is not clustered or clustered into the same group.

In addition, the computing device 1000 may obtain a modified data point set 2420 based on the data point set 2410. In this case, the computing device may obtain the modified data point set 2420 by processing the data point set 2410 based on the pre-stored modification algorithm 2430. Specifically, the computing device 1000 may obtain the modified data point set 2420 by mapping the data point set 2410 to another latent space according to a predetermined condition and then reconstructing the data point set 2410 on the latent space again. In addition, the modified data point set 2420 may include a modified first data point 2421 and a modified second data point 2422. For example, the modified first data point 2421 may be obtained by adjusting a position in the latent space of the first data point 2411, and the modified second data point 2422 may be obtained by adjusting a position in the latent space of the second data point 2422. That is, the first data point 2411 may correspond to the modified first data point 2421, and the second data point 2412 may correspond to the modified second data point 2422. In addition, the modified data point set 2420 may further include third data point 2423. In this case, the third data point 2423 may be a data point that is not included in the data point set 2410. In other words, the computing device 1000 may generate an arbitrary third data point 2423 based on the modification algorithm 2430. That is, the data point set 2410 may not include a data point corresponding to the third data point 2423.

In addition, referring back to FIG. 23, the computing device may obtain synthetic data based on the modified data point set (S1032). In this case, the synthetic data may mean data arbitrarily generated by the computing device according to a predetermined algorithm. Specifically, the synthetic data is data having the same modality as the obtained data set, but may mean data not included in the data set. More specifically, the computing device may generate the synthetic data by processing the modified data point set based on a predetermined algorithm.

In addition, the computing device may provide the modified data set including the synthetic data (S1033). In this case, the modified data set may include at least one data point that is not included in the data set.

As a specific example, referring back to FIG. 24, the computing device 1000 may provide a modified data set 2450 based on the modified data point set 2420. In this case, the computing device 1000 may provide the modified data set 2450 including the at least one synthetic data point by generating at least one synthetic data point based on the modified data set 2450.

In addition, the computing device 1000 may reconstruct the modified data point set 2420 on an output domain using the inverse function $f^{-1}$ of a mapping function used to obtain the data point set 2410, thereby providing the modified data set 2450. In addition, the computing device 1000 may reconstruct the modified data point set 2420 on an output domain using the inverse function $f^{-1}$ of a mapping function used to obtain the data point set 2410, thereby providing the modified data set 2450.

In addition, each data point included in the modified data set 2450 may correspond to each data point included in the modified data point set 2420. For example, the computing device 1000 may obtain a first synthetic data point 2451 based on the modified first data point 2421, a second synthetic data based on the modified second data point 2422, and obtain a third synthetic data point 2453 based on the third data point 2423. That is, the first synthetic data point 2451 may correspond to the modified first data point 2421, the second synthetic data point 2452 may correspond to the modified second data point 2422, and the third synthetic data point 2453 may correspond to the third data point 2423.

In addition, the modified data set 2450 may include at least one data point that is not included in the data set 2400. In addition, the modified data set 2450 may not include at least one data point that is included in the data set 2400. In addition, the number of data points included in the modified data set 2450 may be greater than or equal to the number of data points included in the data set 2400.

As described above, the computing device may generate synthetic data in a neural rendering method based on data modification, but is not limited thereto.

The computing device according to various embodiments may generate synthetic data in a computer-graphics (CG)-based rendering method based on the data modification. Specifically, the computing device may generate synthetic data by generating CG parameters based on the generated modified data point set. More specifically, the computing device may generate synthetic data by obtaining a rendering parameter based on at least one data point included in the modified data point set. For example, the computing device may generate the synthetic data by implementing the inverse function $f^{-1}$ of the mapping function as a CG rendering model, but is not limited thereto.

Figure 25:
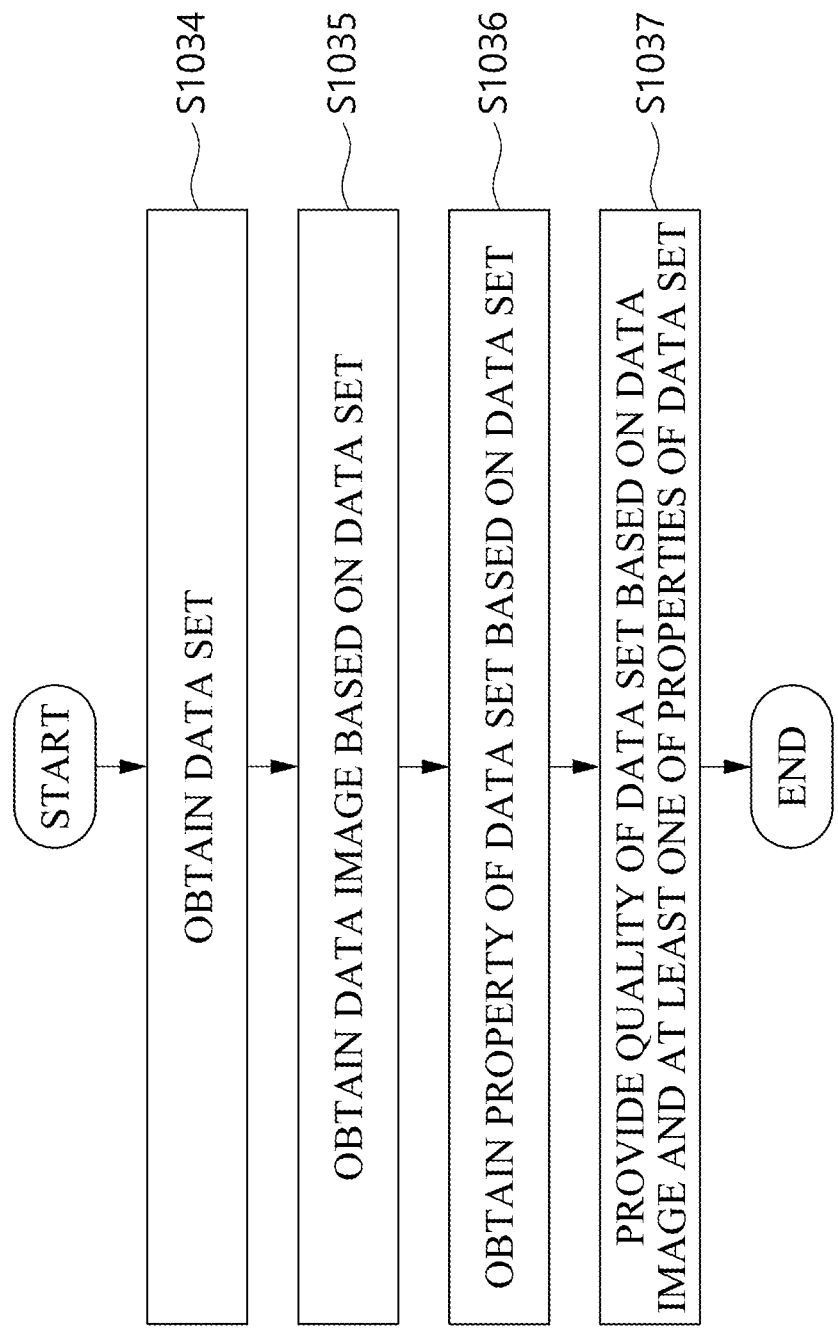
FIG. 25 is a diagram illustrating an operation of providing, by a computing device, a quality of the obtained data set according to various embodiments of the present disclosure.

FIG. 25 is a diagram illustrating an operation of providing, by a computing device, a quality of the obtained data set according to various embodiments of the present disclosure.

Referring to FIG. 25, the computing device may obtain a data set (S1034). In addition, the computing device may obtain an image of data based on the obtained data set (S1035). In this case, since all the above-described technical features (FIGS. 4 to 9) may be applied to operation S1035, a detailed description thereof will be omitted. In addition, the computing device may obtain the property of the data set based on the data point set (S1036). In this case, since all the above-described technical features (FIGS. 10 to 15) may be applied to operation S1036, a detailed description thereof will be omitted.

In addition, the computing device may provide a quality of a data set based on at least one of the image of data and a property of the data set (S1037). Specifically, the computing device may obtain at least one index based on at least one of the image of data and the property of the data set, and may provide the quality of the data set based on the at least one index. For example, the computing device may provide the quality of the data set based on an index including "appropriateness of distribution," "suitability for training," "similarity between data," or "appropriateness of the number of data points" of the data set. In this case, the computing device may evaluate the at least one index with various grades, and may provide a final quality for the data set based on the scores assigned to each index.

For example, the computing device may evaluate the "appropriateness of distribution" based on the image of data or the property of the data set. In this case, the "appropriateness of distribution" may mean how uniformly the data set is distributed. More specifically, the computing device may evaluate the "appropriateness of the distribution" based on the uniformity of the data distribution appearing on the image of data or the density (or uniformity) of the data set included in the property of the data set. For example, when the distribution of data is uniform, the computing device may evaluate a grade of the "appropriateness of distribution" of the data set as "great," but is not limited thereto.

As another example, the computing device may evaluate the "suitability for training" based on the image of data or the property of the data set. In this case, the "suitability for training" may mean how well the data set is suitable for training a specific deep learning model. More specifically, the computing device may evaluate the "suitability for training" based on the task-dependent property included in the property of the data set. For example, the computing device may evaluate whether the data set is suitable for training an image classification model by determining how uniformly the data set includes data corresponding to a class to be classified, but is not limited thereto.

As another example, the computing device may evaluate the "similarity between data" based on the image of data or the property of the data set. In this case, the "similarity between data" may mean how similar the data included in the data set is. More specifically, the computing device may evaluate the "similarity between data" based on the distance in the latent space between the data points included in the data set.

As another example, the computing device may evaluate the "appropriateness of the number of data points" based on the image of data or the property of the data set. More specifically, the computing device may evaluate whether the data set includes the appropriate number of data points for training a deep learning model.

Figure 26:
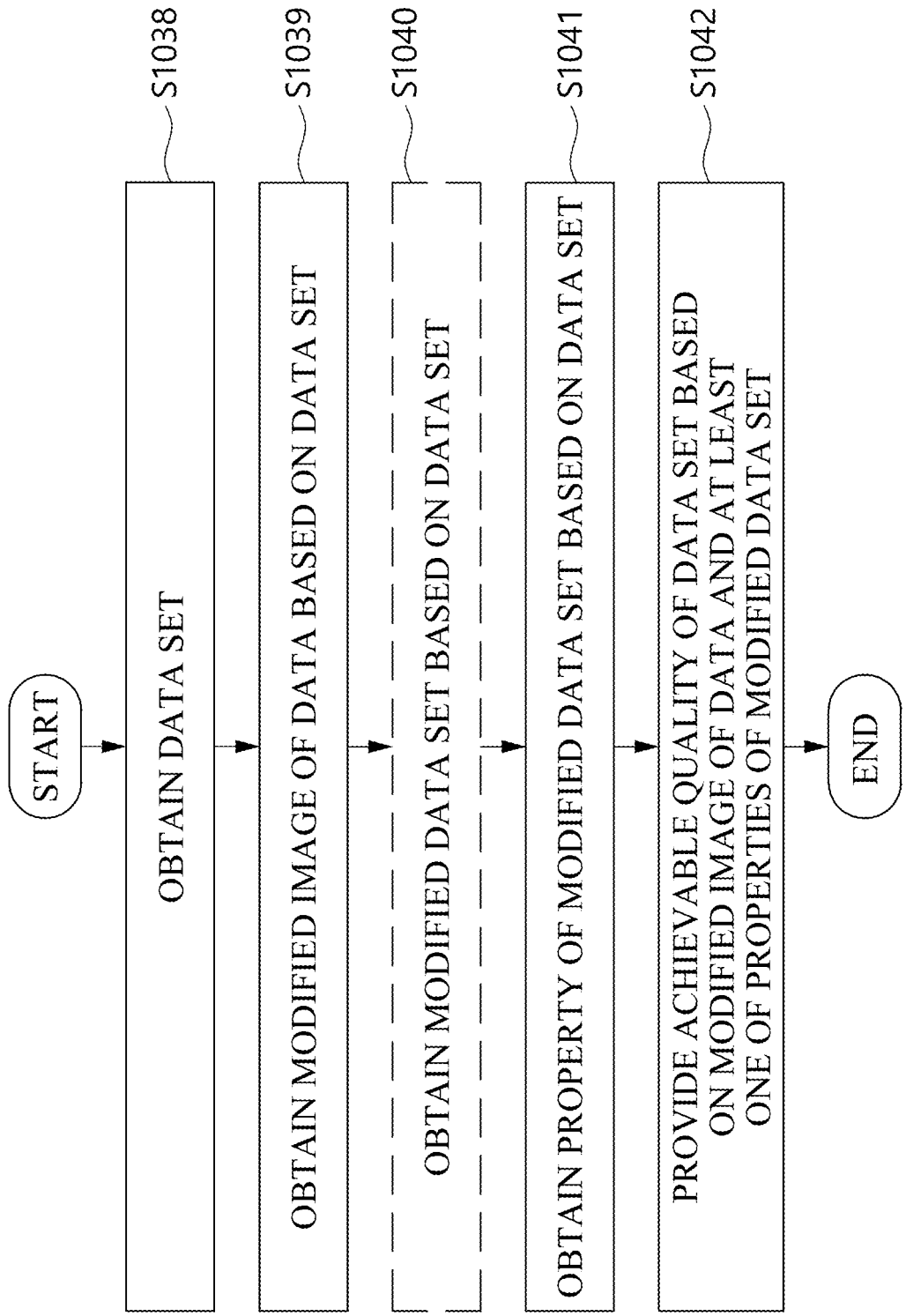
FIG. 26 is a diagram illustrating an operation of providing, by a computing device, an achievable quality of the obtained data set according to various embodiments of the present disclosure.

FIG. 26 is a diagram illustrating an operation of providing, by a computing device, achievable quality of the obtained data set according to various embodiments of the present disclosure.

Referring to FIG. 26, the computing device may obtain a data set (S1038). In addition, the computing device may obtain the modified image of data based on the obtained data set (S1039). In this case, since all the above-described technical features (FIGS. 16 to 22) may be applied to operation S1039, a detailed description thereof will be omitted. In addition, optionally, the computing device may obtain the modified data set based on the data set (S1040). In this case, since all the above-described technical features (FIGS. 23 and 24) may be applied to operation S1040, a detailed description thereof will be omitted. In addition, the computing device may obtain the property of the modified data set based on the data set (S1041). In this case, since all the above-described technical features (FIGS. 10 to 15) may be applied to operation S1041, a detailed description thereof will be omitted. In addition, the computing device may provide the quality of the data set based on at least one of the image of data and a property of the data set (S1042). In this case, the method of providing the quality according to the above-described operation S1037 may be applied to the achievable quality of the data set provided by the computing device as it is when data is modified.

The computing device according to various embodiments of the present disclosure may provide a diagnostic report based on various pieces of information (e.g., an image of data, a property, a modified image of data, quality of a data set, etc.) related to the data set obtained by processing the data set. Specifically, the computing device may provide a comprehensive diagnostic result for the data set through the diagnostic report. In this case, the computing device may output the diagnostic report through an output device (e.g., a display) included in the computing device or an output device of a device capable of communicating with the computing device. For example, when the output device is a display, the computing device may output the diagnostic report on the display screen. In addition, for example, when the output device is a VR device, the computing device may output the diagnostic report to a virtual space transmitted by the VR device.

Figure 27:
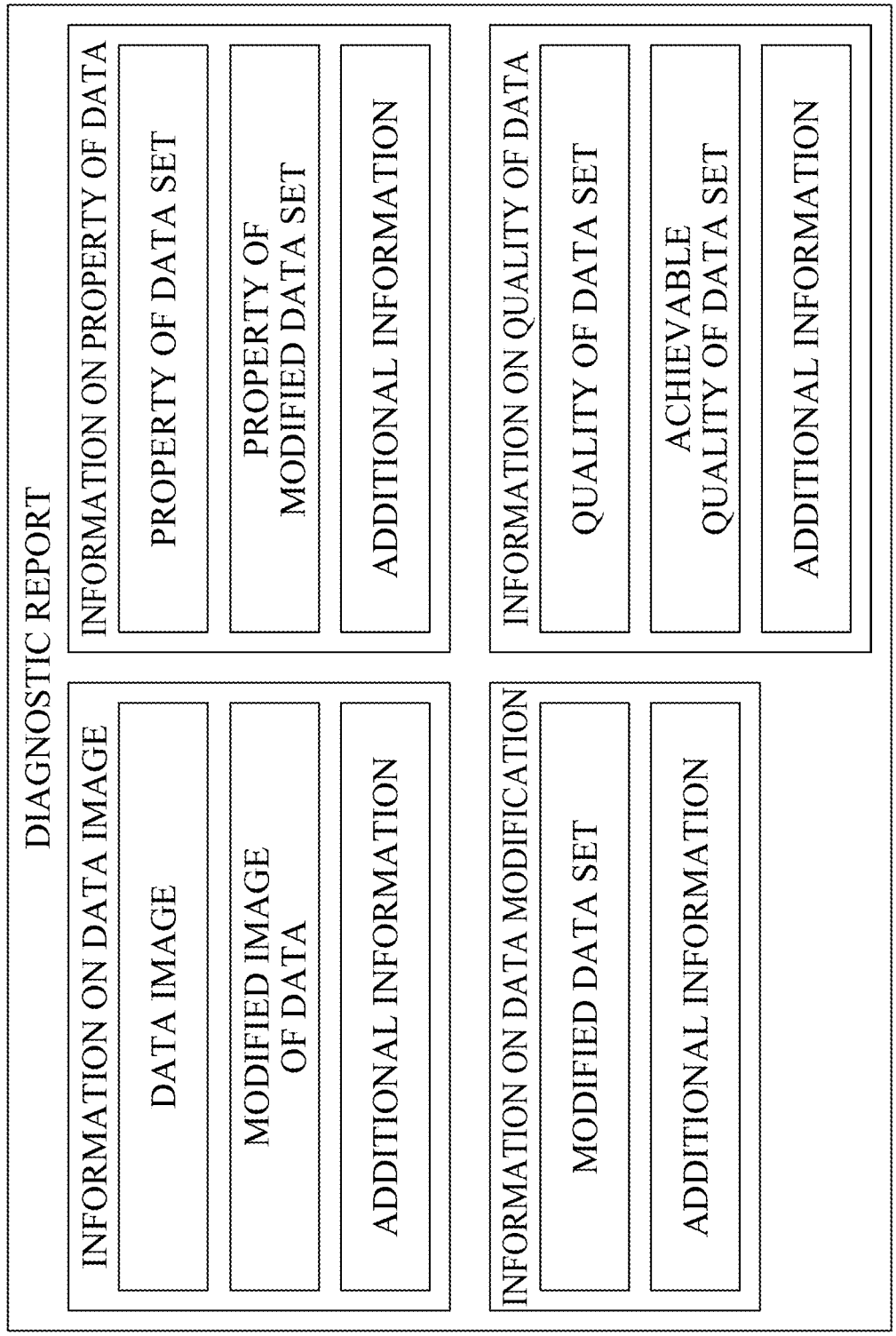
FIG. 27 is a diagram illustrating information included in a diagnostic report provided by a computing device according to various embodiments of the present disclosure.

FIG. 27 is a diagram illustrating information included in a diagnostic report provided by a computing device according to various embodiments of the present disclosure.

Figure 28:
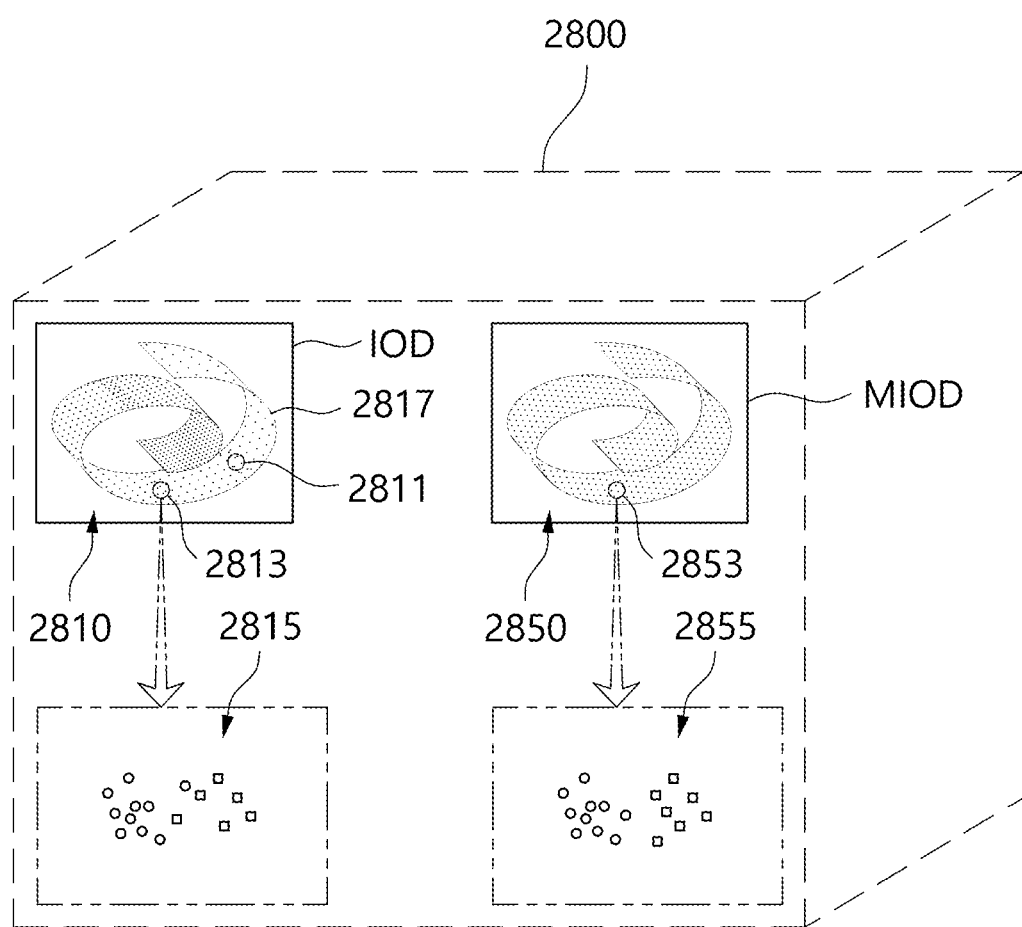
FIG. 28 is a diagram illustrating an example of information on an image of data provided by a computing device according to various embodiments of the present disclosure.

FIG. 28 is a diagram illustrating an example of information on an image of data provided by a computing device according to various embodiments of the present disclosure.

Referring to FIG. 27, the diagnostic report provided by the computing device may include various pieces of information on a data set. Specifically, the computing device may provide a diagnostic report including information on an image of data, information on a property of data, information on data modification, and information on a quality of data.

In this case, the information on the image of data may include an image of data for the data set and a modified image of data for the data set. In addition, the computing device may provide a diagnostic report further including additional information related to the image of data and the modified image of data.

As a specific example, referring to FIG. 28, the diagnostic report provided by the computing device may include information on an image of data including an image of data IOD or a modified image of data MIOD appearing in an imaging space 2800. In this case, the image of data IOD may include a data point set 2810 identified by finding a manifold in which the data point set is present. In this case, the computing device may provide the image of data IOD by removing noise of the data point set 2810 according to the description of FIG. 8. In addition, the modified image of data MIOD may include a modified data point set 2850 obtained by processing with the data point set modification algorithm. In this case, the computing device may provide the modified image of data MIOD by removing the noise of the modified data point set 2850 according to the description of FIG. 8.

In addition, the diagnostic report provided by the computing device may include additional information related to the image of data IOD or the modified image of data MIOD. More specifically, the computing device may process the data set to find a manifold in which the data set is present, thereby identifying the data point set and obtaining various pieces of additional information on the data set based on the data point set. In addition, the computing device may provide various pieces of additional information obtained as described above along with the image of data IOD or the modified image of data MIOD.

The computing device may provide marker information. In this case, the marker information may include a marker for a region specified according to a predetermined criterion in the image of data IOD or the modified image of data MIOD.

Specifically, the computing device may select a specific region satisfying the predetermined criterion from the image of data IOD or the modified image of data MIOD, and generate a marker in the region corresponding to the specific region. In this case, the computing device may select the specific region by identifying whether the property of the data set satisfies the predetermined criterion.

For example, the computing device may provide the marker information by generating a marker corresponding to a blank region in which there is no data in the image of data IOD or the modified image of data MIOD. As a specific example, the computing device may provide the marker information by generating a marker 2811 for the blank region of the data point set 2810 included in the image of data IOD.

As another example, the computing device may provide the marker information by generating a marker corresponding to a dense region in which data is concentrated in the image of data IOD or the modified image of data MIOD.

As another example, the computing device may provide the marker information by generating a marker corresponding to a unique region in which a distribution of data is unique in the image of data IOD or the modified image of data MIOD.

In this case, the computing device may determine a region in which a marker is to be generated in the data point set 2810 or the modified data point set 2850 based on a predetermined algorithm. For example, the computing device may obtain a feature map for locations where data points are present through a convolution operation based on a pre-stored kernel (see the description of FIG. 15), and a blank region, a dense region, or a unique region may be determined based on the feature map.

In addition, the computing device may provide the marker information by generating at least one marker based on an input received from the outside. Specifically, when the computing device receives a marker generation input for a specific region on the image of data IOD or modified image of data MIOD, the computing device may generate a marker in the specific region.

In addition, when the computing device receives an input for selecting at least one marker from the outside, the computing device may provide enlarged image information represented by enlarging a distribution of data points in a region corresponding to the at least one marker on the image of data IOD or the modified image of data MIOD. For example, when the computing device receives an input for selecting a first marker 2813 from a user, the computing device may provide a first enlarged image 2815 by enlarging a distribution of data points in the region corresponding to the first marker 2813, but is not limited thereto.

In addition, according to an embodiment, when the computing device receives an input for selecting at least one marker generated in the modified image of data MIOD from the outside, the computing device may provide not only enlarged image information represented by enlarging a distribution of data points in a region corresponding to the at least one marker on the modified image of data MIOD, but also enlarged image information represented by enlarging the distribution of data points in the same region as the region corresponding to the at least one marker on the image of data IOD. For example, when the computing device receives an input for selecting a second marker 2853 from the user, the computing device may provide a second enlarged image 2855 in which the distribution of data points in the region corresponding to the second marker 2853 is enlarged and a first enlarged image 2815 of the same region (for example, the region in which the first marker 2813 is displayed) as the region in the image of data IOD.

In addition, the computing device may provide manifold boundary information 2817 by displaying a manifold boundary of the image of data IOD or the modified image of data MIOD. Specifically, the computing device may provide the manifold boundary information 2817 by displaying a boundary region of a manifold in which the data point set 2810 identified based on the data set is formed.

In addition, the computing device may provide grouping information (not illustrated) to a manifold boundary of the image of data IOD or the modified image of data MIOD. Specifically, when the data points included in the data point set 2810 or the modified data point set 2850 are clustered into one or more groups, the computing device may add an indication representing the clustered data points to provide the grouping information.

In addition, the computing device may add a visual effect to the image of data IOD or the modified image of data MIOD. Specifically, in order to enhance the visual effect of the image of data IOD or the modified image of data MIOD, the computing device may represent data points included in the data point set 2810 or the modified data point set 2850 using a predetermined color or shape. For example, the computing device may represent the color of the data points included in the region in which data points are concentrated to represent the density of the data set differently from a color of other data points, but is not limited thereto. In addition, for example, the computing device may represent data points clustered into different groups using different shapes, but is not limited thereto.

In addition, the computing device may provide comparison information (not illustrated) representing a difference between the image of data IOD or the modified image of data MIOD. Specifically, the computing device may display a different part in the modified image of data MIOD compared to the existing image of data IOD by modifying the data set. For example, as the computing device generates a modified data point set 2850 based on the data point set 2810, the computing device may display a region in which the distribution of data points is changed on the modified data point set 2850 based on the data point set 2810, but is not limited thereto.

Referring back to FIG. 27, the computing device may provide a diagnostic report including information on a property of data. In this case, the information on the property of data may include, but is not limited to, the property of the obtained data set and the property of the modified data set, and may further include obtainable additional information based on the property of the data set and the property of the modified data set.

In addition, the computing device may provide a diagnostic report including information on data modification. In this case, the information on data modification may include, but is not limited to, a modified data set, and may further include obtainable additional information based on the modified data set. For example, the information on the data modification may include synthetic data generated based on the modified data points included in the modified data set. In addition, for example, the information on the data modification may include sample information obtained by extracting some of the synthetic data points.

In addition, the computing device may provide a diagnostic report including information on the quality of data. In this case, the information on the quality of data may include, but is not limited to, the quality of the obtained data set and the achievable quality of the data set, and may further include obtainable additional information based on the quality of the data set and the achievable quality of the data set.

Figure 29:
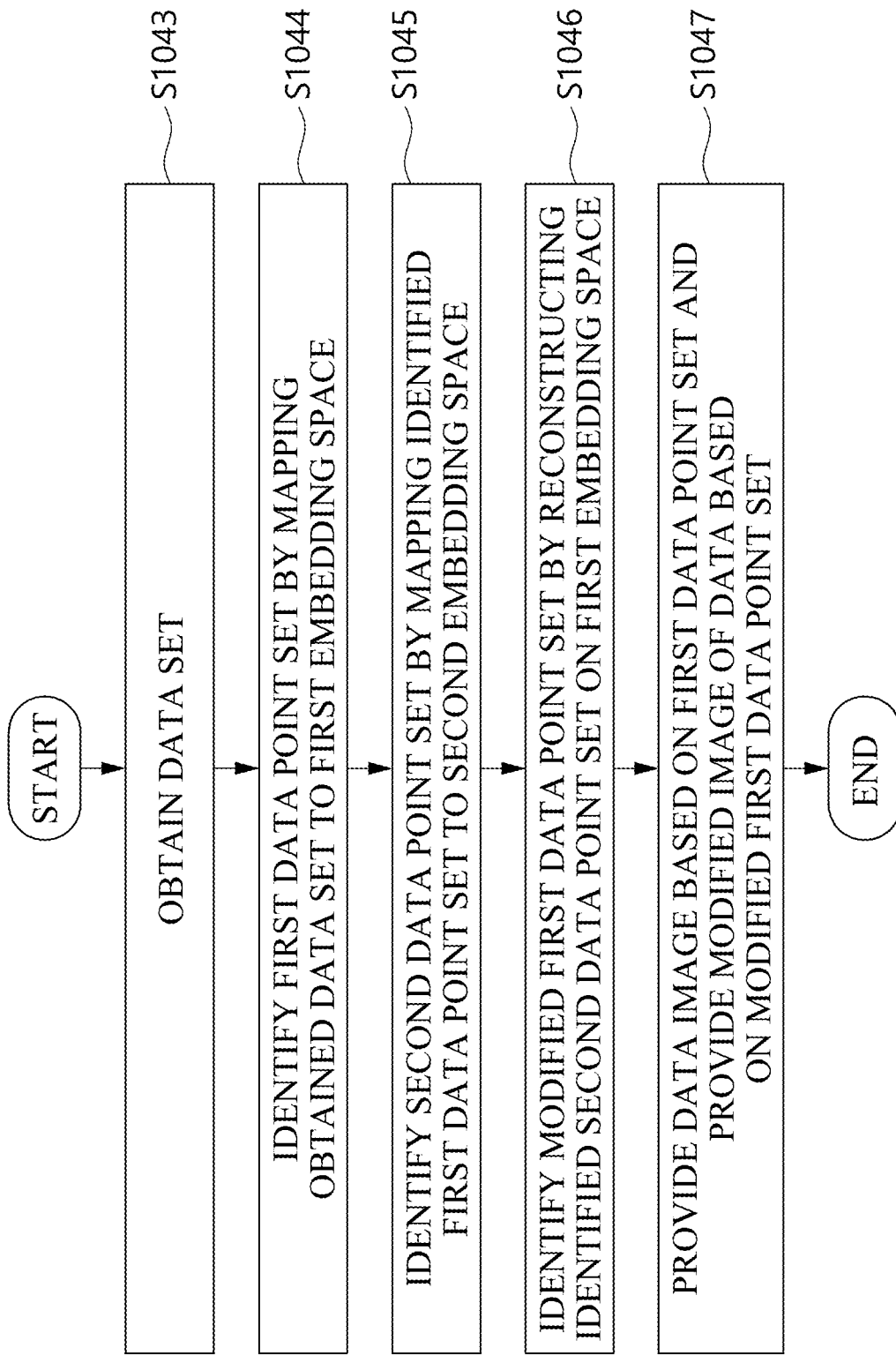
FIG. 29 is a diagram for describing an operation of providing, by a computing device, an image of data and a modified image of data of a data set according to various embodiments of the present disclosure.

FIG. 29 is a diagram for describing an operation of providing, by a computing device, an image of data and a modified image of data of a data set according to various embodiments of the present disclosure.

Referring to FIG. 29, the computing device may obtain a data set (S1043). In addition, the computing device may identify a first data point set by mapping the obtained data set to a first embedding space (S1044). In this case, since all the above-described technical features (FIGS. 4 to 9) may be applied to operations S1043 and S1044, a detailed description thereof will be omitted.

In addition, the computing device may identify a second data point set by mapping the identified first data point set to a second embedding space (S1045). In addition, the computing device may identify the modified first data point set by reconstructing the identified second data point set on the first embedding space (S1046). In this case, since all the above-described technical features (FIGS. 16 to 22) may be applied to operations S1045 and S1046, a detailed description thereof will be omitted.

In addition, the computing device may provide an image of data based on the first data point set and provide a modified image of data based on the modified first data point set (S1047). In this case, since all the above-described technical features (FIGS. 4 to 9) may be applied to a specific method of providing, by a computing device, an image of data based on the first data point set, a detailed description thereof will be omitted. In addition, in operation S1047, the computing device may represent the modified image of data in the same imaging space as the image of data. In addition, the present disclosure is not limited thereto, and the computing device may represent the modified image of data in an imaging space different from that of the image of data.

Alternatively or additionally, the computing device may obtain the property of the data set based on the first data point set, and the modified property of the data set based on the modified first data point set. In this case, since all the above-described technical features (FIGS. 10 to 15) may be applied to a specific method of obtaining the property of the data set, a description thereof will be omitted.

Alternatively or additionally, the computing device may provide a modified data set including synthetic data by reconstructing the modified data point set on an output domain. In this case, since all the above-described technical features (FIGS. 23 and 24) may be applied to a specific method of providing the modified data set, a description thereof will be omitted.

Figure 30:
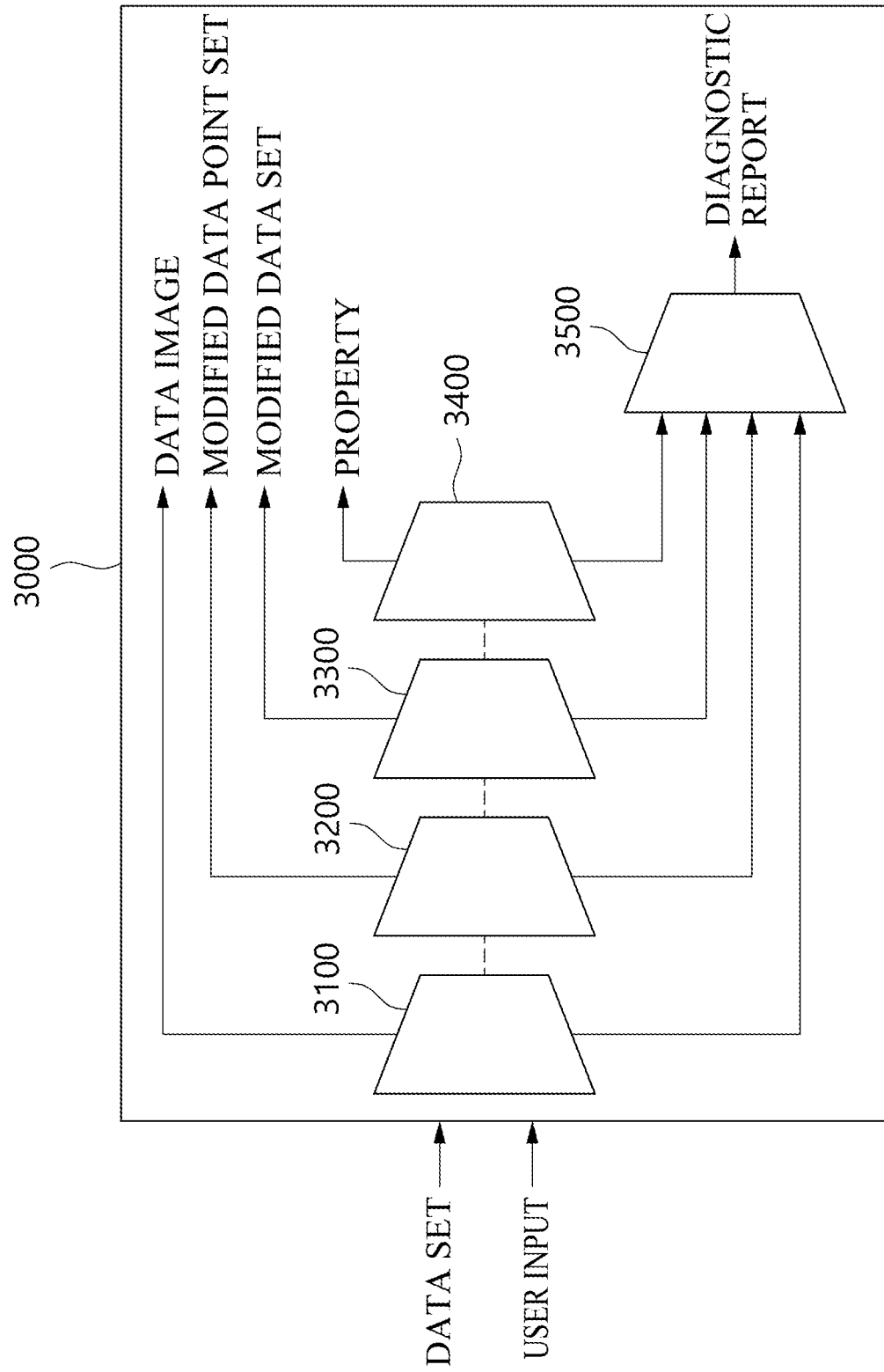
FIG. 30 is a diagram illustrating algorithm performance models constituting a computing device according to various embodiments of the present disclosure.

FIG. 30 is a diagram illustrating algorithm performance models constituting a computing device according to various embodiments of the present disclosure.

Referring to FIG. 30, a computing device 3000 may include a plurality of algorithm performance models having different purposes. Specifically, the computing device 3000 may include a plurality of algorithm performance models designed to output a specific output. For example, the computing device may include an imaging model 3100 designed to provide an image of data, a modified model 3200 designed to provide a modified data point set, a generation model 3300 designed to generate a modified data set including synthetic data, a property mining model 3400 designed to calculate a property of data, and a diagnostic model 3500 designed to provide a diagnostic report, but is not limited thereto. Of course, a plurality of algorithm performance models may be implemented as one integrated model.

In addition, the computing device may selectively output the output data by selectively inputting input data to at least some of the plurality of algorithm performance models. In this case, the computing device may make a determination based on which models to process the data set based on a user input which is input along with the data set. For example, when the computing device obtains a data set along with a user input for outputting an image of data, the computing device may output the image of data by inputting the data set into the imaging model 3100.

In addition, output data of a specific model among the plurality of algorithm models may be used as input data of another model. For example, when the computing device obtains a data set along with a user input to generate synthetic data, the computing device may obtain a modified data point set obtained by inputting the data set into the modified model 3200 and provide the modified data point set including the synthetic data by inputting the modified data point set to the generation model 3300.

In addition, when the computing device obtains a data set along with a user input to generate the modified image of data, the computing device may obtain modified data point set obtained by inputting the data set into the modified model 3200 and provide the modified image of data by inputting the modified data point set to the imaging model 3100.

In addition, for example, when the computing device obtains the data set along with the user input to generate the diagnostic report, the computing device may provide the diagnostic report by inputting an image of data obtained based on the data set, a modified image of data, a modified data point set, a property of a data set, and an modified property of the data set to the diagnostic model 3500.

Figure 31:
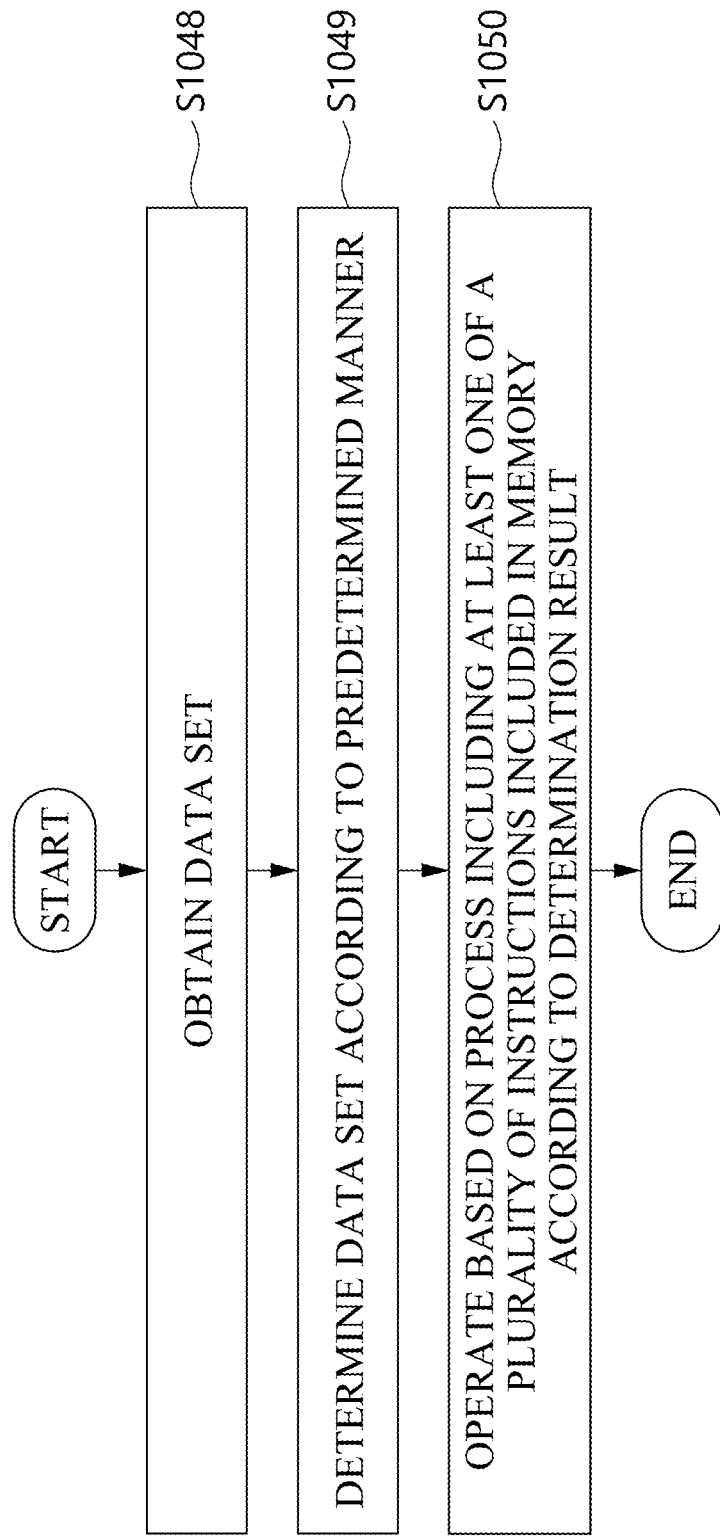
FIG. 31 is a diagram illustrating a method of selectively performing, by at least one processor included in a computing device, an operation based on a data set according to various embodiments of the present disclosure.

FIG. 31 is a diagram illustrating a method of selectively performing, by at least one processor included in a computing device, an operation based on a data set according to various embodiments of the present disclosure.

Referring to FIG. 31, the at least one processor may obtain a data set (S1048). In addition, at least one processor may determine the data set according to a predetermined method (S1049). For example, the at least one processor may determine the capacity, the application domain, the modality, the type, the number of modalities, or the like of the data set.

In addition, the at least one processor may determine the data set based on a pre-stored algorithm. In addition, at least one processor may determine the data set by searching for data similar to the obtained data set in a pre-stored database.

In addition, the at least one processor may perform an operation based on at least one of a plurality of instructions stored in the memory of the computing device according to the determination result (S1050).

Specifically, the at least one processor may perform a process indicated by at least one instruction determined based on an identified trigger as a result of determining the data set. In this case, the trigger may be an event that triggers the operation of the at least one processor, and the process performed by the at least one processor may be determined according to the type of the trigger. More specifically, the trigger may be an event instructing to provide specific output data, but is not limited thereto.

A specific example will be described with reference to FIG. 32.

Figure 32:
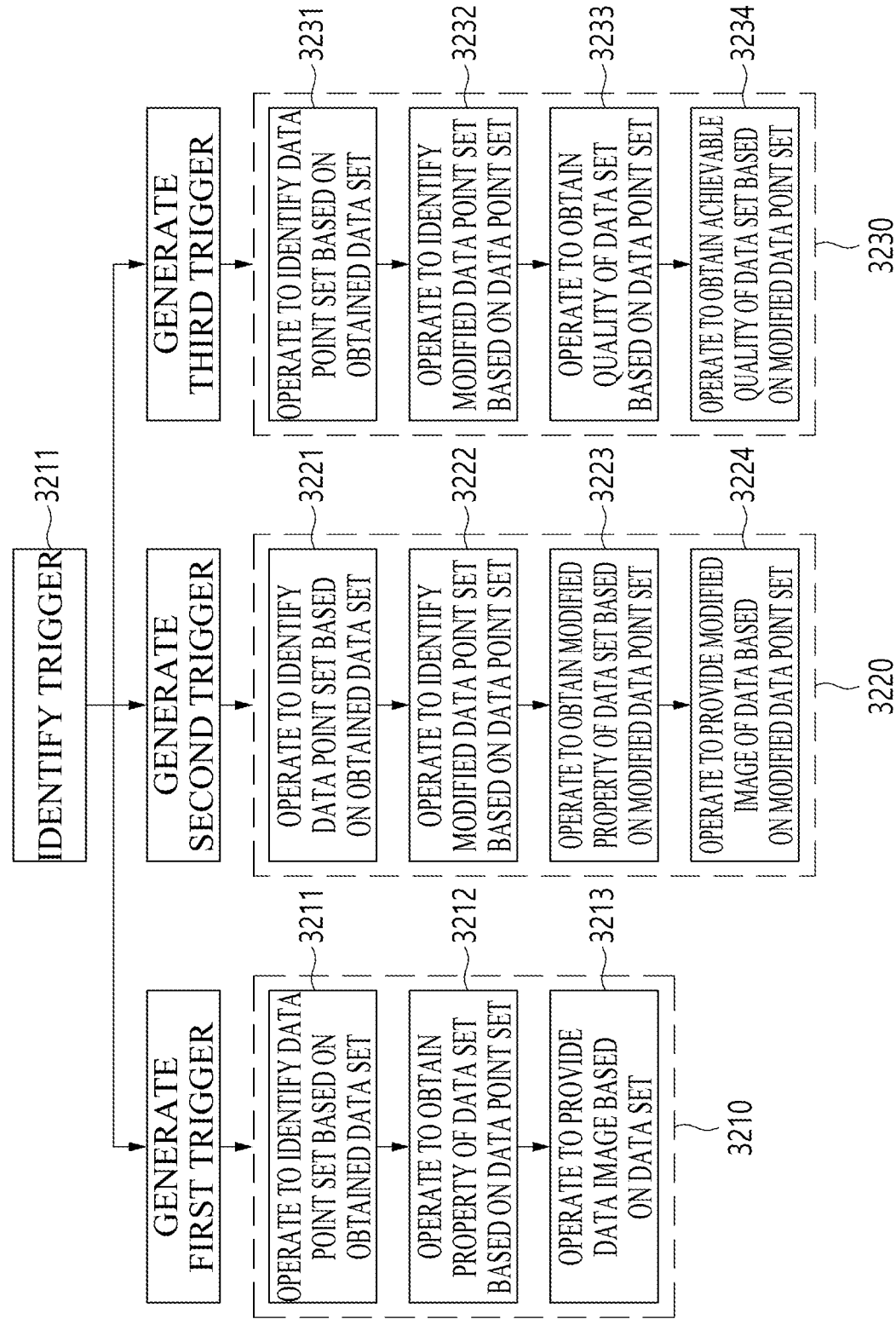
FIG. 32 is a diagram illustrating various processes performed by at least one processor according to instructions stored in a memory of a computing device according to various embodiments of the present disclosure.

FIG. 32 is a diagram illustrating various processes performed by at least one processor according to instructions stored in a memory of a computing device according to various embodiments of the present disclosure.

Referring to FIG. 32, when the trigger is identified, at least one processor of the computing device may operate based on one of a plurality of processes (data processing pipeline) according to the trigger.

Specifically, when a first trigger occurs, at least one processor may operate based on a first process 3210. In this case, the at least one processor may operate based on at least some of a plurality of instructions included in the first process 3210.

For example, when the first trigger instructs to provide an image of data, the at least one processor may operate based on an instruction 3211 instructing the at least one processor to perform an operation of identifying a data point set based on the obtained data set; and an instruction 3213 instructing the at least one processor to perform an operation of providing an image of data based on the data set. Of course, an operation may be further performed based on an instruction 3212 instructing the at least one processor to perform an operation of obtaining a property of a data set based on the data point set.

In addition, for example, when the first trigger instructs to provide a property of a data set, the at least one processor may operate based on the instruction 3211 instructing the at least one processor to perform an operation of identifying a data point set based on the data set obtained by the at least one processor and the instruction 3212 instructing the at least one processor to perform an operation of obtaining a property of a data set based on the data point set.

In addition, the computing device may pre-store the information on the first trigger connected to the first process 3210. Specifically, the first trigger may include a result of receiving a user input instructing to provide an image of data and determining a data set. In addition, the first trigger may occur immediately after the data set is input. In other words, the first trigger instructing to provide the image of data may be a basic trigger that occurs simultaneously with obtaining the data set, but is not limited thereto.

In addition, when a second trigger occurs, at least one processor may operate based on a second process 3220. In this case, the at least one processor may operate based on at least some of a plurality of instructions included in the second process 3220.

For example, when the second trigger instructs to provide the modified data point set, the at least one processor may operate based on an instruction 3221 instructing the at least one processor to perform an operation of identifying a data point set based on the data set obtained by the at least one processor and an instruction 3222 instructing the at least one processor to perform an operation of identifying a modified data point set based on the data point set.

In addition, for example, when the second trigger instructs to provide the modified property of the data set, the at least one processor may operate based on an instruction 3221 instructing the at least one processor to perform an operation of identifying the data point set based on the data set obtained by the at least one processor, an instruction 3222 instructing the at least one processor to perform an operation of identifying the modified data point set based on the data point set, and an instruction 3223 instructing the at least one processor to perform an operation of obtaining the modified property of the data set based on the modified data point set.

In addition, for example, when the second trigger instructs to provide the modified image of data of the data set, the at least one processor may operate based on the instruction 3221 instructing the at least one processor to perform an operation of identifying the data point set based on the data set obtained by the at least one processor, the instruction 3222 instructing the at least one processor to perform an operation of identifying the modified data point set based on the data point set, and an instruction 3224 instructing the at least one processor to perform an operation of providing the modified image of data based on the modified data point set.

In addition, the computing device may pre-store the information on the second trigger connected to the second process 3220. Specifically, the second trigger may include a result of receiving a user input instructing to provide the modified image of data and determining a data set.

In addition, when a third trigger occurs, at least one processor may operate based on a third process 3230. In this case, the at least one processor may operate based on at least some of a plurality of instructions included in the third process 3230.

For example, when the third trigger instructs to provide a quality of a data set, the at least one processor may operate based on an instruction 3231 instructing the at least one processor to perform an operation of identifying a data point set based on the data set obtained by the at least one processor and an instruction 3233 instructing the at least one processor to perform an operation of obtaining the quality of a data set based on the data point set.

In addition, for example, when the third trigger instructs to provide the achievable quality of the data set, the at least one processor may operate based on an instruction 3231 instructing the at least one processor to perform an operation of identifying the data point set based on the data set obtained by the at least one processor, an instruction 3232 instructing the at least one processor to perform an operation of identifying the modified data point set based on the data point set, and an instruction 3234 instructing the at least one processor to perform an operation of obtaining the achievable quality of the data set based on the modified data point set.

In addition, the computing device may pre-store the information on the third trigger connected to the third process 3230. Specifically, the third trigger may include a result of a determination on the data set and reception of a user input instructing to provide the achievable quality of the data set.

The selective operation of the at least one processor is not limited to the process illustrated in FIG. 32, and the operation of the processor may be selectively performed according to a trigger generated based on an output that can be output by the computing device according to various embodiments of the present disclosure. For example, when a fourth trigger (not illustrated) instructs to provide a diagnostic report, the at least one processor may operate based on at least one instruction instructing to obtain pieces of information necessary for generating the diagnostic report.

In addition, the computing device according to various embodiments may configure a preset database by databaseizing a plurality of processes configured with a plurality of instructions as described above. Specifically, the computing device may store the above-described method (e.g., data imaging, property mining, modification, evaluation, etc.), input data and output data accompanying the method, and furthermore, may store a method (for example, a dimension determination method, an optimized shape determination method, etc.) of generating a manifold accompanying the method, etc. to configure the preset database.

In addition, when the data set is input, the computing device may select at least one of a plurality of processes stored in the preset database and process the data set based on the selected process.

Also, the computing device may reconfigure the preset database. More specifically, the computing device may perform an iterative optimization process to generate a more optimized output, rather than generating a final output by processing the input data set according to the initially determined process, and thus, may reconfigure the preset database based on the optimized processes. For example, the computing device may reconfigure the preset database based on a machine learning method, but is not limited thereto.

Figure 33:
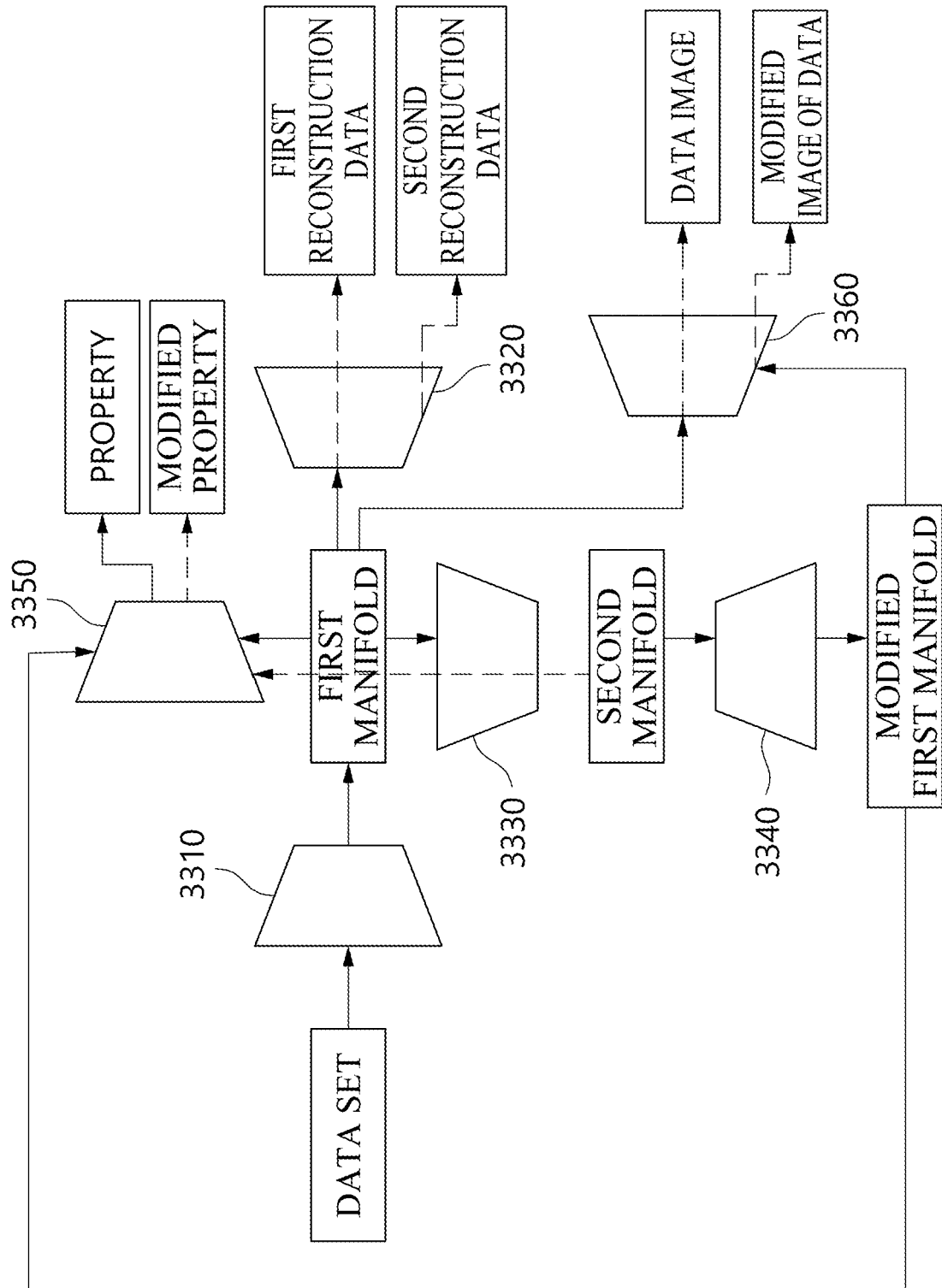
FIG. 33 is a diagram illustrating an implementation example of a computing device according to various embodiments of the present disclosure.

FIG. 33 is a diagram illustrating an implementation example of a computing device according to various embodiments of the present disclosure.

Referring to FIG. 33, the computing device may include various configurations for outputting various pieces of output data based on a data set defined on an input domain.

Specifically, the computing device may include a first converter 3310 designed to generate a first manifold based on the obtained data set. In this case, the first manifold may be defined on the first embedding space. In addition, the first converter 3310 may convert the data set into the first manifold based on a first predetermined function. In addition, the computing device may include a second converter 3330 designed to generate a second manifold based on the first manifold. In this case, the second manifold may be defined in a second embedding space having a different dimension from the first embedding space. In addition, the second converter 3330 may convert the first manifold into the second manifold based on a second predetermined function. For example, the first converter 3310 and the second converter 3330 may include an encoder, but is not limited thereto.

In addition, the computing device may include a first reconstructor 3320 designed to generate first reconstruction data based on the first manifold. In this case, the first reconstruction data may be defined on an output domain having the same dimension as the input domain. Also, the first reconstructor 3320 may reconstruct the first manifold to the first reconstruction data based on an inverse function of the first predetermined function. In addition, the computing device may include a second reconstructor 3340 designed to generate a modified first manifold based on the second manifold. In this case, the modified first manifold may be defined in a third embedding space having the same dimension as the first embedding space. Also, the second reconstructor 3340 may reconstruct the second manifold to the modified first manifold based on an inverse function of the second predetermined function.

In addition, the computing device may include a property miner 3350 designed to generate the property of the data set based on the first manifold and generate the modified property of the data set based on the second manifold or the modified first manifold. In this case, the property of the data set or the modified property of the data set may be provided in the form of a feature map. In addition, the property miner 3350 may be provided in the form of a feed-forward neural network.

Also, the computing device may include an imaging device 3360 designed to generate an image of data based on the first manifold and generate a modified image of data based on the modified first manifold. In this case, the image of data and the modified image of data may appear on a predetermined imaging space. Also, the imaging device 3360 may represent the first manifold and the modified first manifold as the image of data and the modified image of data, respectively, based on a predetermined data visualization algorithm.

The method according to an embodiment may be implemented in the form of program instructions executable by a variety of computer means and may be recorded on a computer-readable medium. The computer-readable medium may include program instructions, data files, data structures, and the like alone or in combination. The program instructions recorded on the medium may be designed and configured specifically for an embodiment or may be publicly known and usable by those who are skilled in the field of computer software. Examples of the computer-readable medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device specially configured to store and perform program instructions, for example, a read-only memory (ROM), a random access memory (RAM), a flash memory, etc. Examples of the computer instructions include not only machine language code generated by a compiler, but also high-level language code executable by a computer using an interpreter or the like. The hardware device may be configured to operate as one or more software modules in order to perform the operations of an embodiment, and vice versa.

According to the present disclosure, it is possible to preserve the intrinsic properties of data using a data processing method that considers a distribution of data points.

In addition, according to the present disclosure, it is possible to efficiently output various pieces of information on data using a data visualization method that considers the actual properties of data.

Effects of the present invention are not limited to the above-described effects, and effects not mentioned will be clearly understood by those of ordinary skill in the art to which the present invention belongs from the present specification and accompanying drawings.

Although the present disclosure has been described with reference to specific embodiments and drawings, it will be appreciated that various modifications and changes can be made from the disclosure by those skilled in the art. For example, suitable results may be achieved if the described techniques are performed in a different order and/or if components in a described system, architecture, device, or circuit are combined in a different manner and/or replaced or supplemented by other components or their equivalents.

Therefore, other implementations, embodiments, and equivalents are within the scope of the following claims.

What is claimed is:

1. A method comprising:
at an electronic device with one or more processors electronically connected to a memory,
obtaining a data set;
identifying, using a first trained model, a first data point set on a first embedding space based on the data set by obtaining features of data included in the data set from at least one layer of the first trained model, wherein each data point included in the first data point set corresponds to each data included in the data set, and a first property of the data set is associated with dimensionality of the first data point set;
identifying, using a second trained model, a modified first data point set on the first embedding space based on the first data point set by processing at least one data point to adjust distribution of the first data point set, wherein the modified first data point set includes at least one modified data point which is not included in the first data point set, and wherein a first modified property of the data set is associated with dimensionality of the modified first data point set;
obtaining, using a third trained model, a second property of the data set based on the first data point set by obtaining output corresponding to the second property from at least one layer of the third trained model, wherein the second property is associated with distribution of the data set; and
obtaining, using the third trained model, a second modified property of the data set based on the modified first data point set by obtaining output corresponding to the second modified property from at least one layer of the third trained model, wherein the second modified property is associated with adjusted distribution of the data set, and wherein the second property and the second modified property are different.

2. The method of claim 1, wherein the second property represents at least one of a density value of at least portion of the data set and a bias value of at least portion of the data set.

3. The method of claim 1, wherein identifying, using the first trained model, the first data point set comprises:
identifying a first manifold obtained by mapping the data set on the first embedding space based on a first predetermined criterion, wherein the first manifold is associated with a shape formed by the first data point set; and
identifying the first data point set included in the first manifold.

4. The method of claim 3, wherein identifying, using the first trained model, the first data point set further comprises:
obtaining a first reconstruction data set by reconstructing the first data point set, wherein a modality of the first reconstruction data set corresponds to the data set, and wherein the first predetermined criterion is set based on a similarity between the data set and the first construction data set.

5. The method of claim 1, further comprising:
identifying, using a fourth trained model, a second data point set on a second embedding space based on the first data point set, wherein the modified first data set is obtained by reconstructing the second data point set to the first embedding space.

6. The method of claim 5, wherein identifying the second data point set comprises:
identifying a second manifold obtained by mapping the first data point set to the second embedding space according to a second predetermined criterion, wherein the second manifold is associated with a shape formed by the second data point set, and
identifying the second data point set included in the second manifold, wherein the second predetermined criterion is set based on a similarity between a plurality of data points included in the first data point set.

7. The method of claim 6, wherein the at least one modified data point is obtained by reconstructing at least one data point included in the second data point set to the first embedding space.

8. The method of claim 1, wherein identifying, using a second trained model, the modified first data point set comprises:
clustering the first data point set into at least one group; and
adjusting a distance between a first data point included in a first group of the at least one group and a second data point included in a second group of the at least one group on the first embedding space.

9. The method of claim 8, wherein the distance between the first data point and the second data point is adjusted so that the distance between the first data point and the second data point is greater than a distance between the first data point and a third data point included in the first group.

10. The method of claim 1, further comprising:
providing an Image of Data (IOD) by representing the first data point set on the imaging space; and
providing a Modified Image of Data (MIOD) by representing the modified first data point set on an imaging space.

11. The method of claim 10, wherein providing the IOD comprises:
identifying a boundary region formed by the first data point set on the first embedding space; and
obtaining the IOD by representing the first data point set on the imaging space so that at least one data point positioned outside the boundary region is deleted.

12. The method of claim 10, further comprising:
providing a comparison information representing a difference between the IOD and the MIOD.

13. The method of claim 10, wherein the imaging space comprises a space in which the IOD and the MIOD are displayed by at least one output device connected to the electronic device.

14. The method of claim 10, wherein the imaging space comprises a space in which the modified first data point set is visually identified.

15. The method of claim 10, wherein providing the MIOD comprises:
representing the at least one modified data point visually different with another data points included in the modified first data point set.

16. The method of claim 1, wherein the data set comprises a first data of a first modality and a second data of a second modality.

17. The method of claim 16, wherein the first modality is associated with an image data, and the second modality is associated with an annotation labeled on the image data.

18. The method of claim 1, further comprising:
providing a modified data set by reconstructing the modified first data point set on an output domain, wherein the modified data set includes at least one synthetic data corresponding to the at least one modified data point.

19. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining a data set;
identifying, using a first trained model, a first data point set on a first embedding space based on the data set by obtaining features of data included in the data set from at least one layer of the first trained model, wherein each data point included in the first data point set corresponds to each data included in the data set, and wherein a first property of the data set is associated with dimensionality of the first data point set;
identifying, using a second trained model, a modified first data point set on the first embedding space based on the first data point set by processing at least one data point to adjust distribution of the first data point set, wherein the modified first data point set includes at least one modified data point which is not included in the first data point set, and wherein a first modified property of the data set is associated with dimensionality of the modified first data point set;
obtaining, using a third trained model, a second property of the data set based on the first data point set by obtaining output corresponding to the second property from at least one layer of the third trained model, wherein the second property is associated with distribution of the data set; and
obtaining, using the third trained model, a second modified property of the data set based on the modified first data point set by obtaining output corresponding to the second modified property from at least one layer of the third trained model, wherein the second modified property is associated with adjusted distribution of the data set, and wherein the second property and the second modified property are different.

20. A non-transitory computer-readable storage medium, storing program instructions computer-executable on a computer to perform operations comprising:
obtaining a data set;
identifying, using a first trained model, a first data point set on a first embedding space based on the data set by obtaining features of data included in the data set from at least one layer of the first trained model, wherein each data point included in the first data point set corresponds to each data included in the data set, and wherein a first property of the data set is associated with dimensionality of the first data point set;
identifying, using a second trained model, a modified first data point set on the first embedding space based on the first data point set by processing at least one data point to adjust distribution of the first data point set, wherein the modified first data point set includes at least one modified data point which is not included in the first data point set, and wherein a first modified property of the data set is associated with dimensionality of the modified first data point set;
obtaining, using a third trained model, a second property of the data set based on the first data point set by obtaining output corresponding to the second property from at least one layer of the third trained model, wherein the second property is associated with distribution of the data set; and
obtaining, using the third trained model, a second modified property of the data set based on the modified first data point set by obtaining output corresponding to the second modified property from at least one layer of the third trained model, wherein the second modified property is associated with adjusted distribution of the data set, and wherein the second property and the second modified property are different.

* * * * *